(12) United States Patent
Zhang et al.

(10) Patent No.: US 12,167,383 B2
(45) Date of Patent: Dec. 10, 2024

(54) INFORMATION DETERMINATION, ACQUISITION AND TRANSMISSION METHODS, APPARATUSES AND DEVICES, AND STORAGE MEDIUM

(71) Applicant: ZTE Corporation, Shenzhen (CN)

(72) Inventors: Shujuan Zhang, Shenzhen (CN); Zhaohua Lu, Shenzhen (CN); Jianwei Wang, Shenzhen (CN); Bo Gao, Shenzhen (CN); Chuangxin Jiang, Shenzhen (CN); Zhen He, Shenzhen (CN); Huahua Xiao, Shenzhen (CN); Yu Pan, Shenzhen (CN); Xinquan Ye, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 395 days.

(21) Appl. No.: 17/765,039

(22) PCT Filed: Sep. 28, 2020

(86) PCT No.: PCT/CN2020/118246
§ 371 (c)(1),
(2) Date: Mar. 30, 2022

(87) PCT Pub. No.: WO2021/063296
PCT Pub. Date: Apr. 8, 2021

(65) Prior Publication Data
US 2022/0386295 A1    Dec. 1, 2022

(30) Foreign Application Priority Data
Sep. 30, 2019   (CN) .......................... 201910945704.9

(51) Int. Cl.
H04L 12/00    (2006.01)
H04W 72/044  (2023.01)
H04W 72/23    (2023.01)

(52) U.S. Cl.
CPC ......... *H04W 72/046* (2013.01); *H04W 72/23* (2023.01)

(58) Field of Classification Search
CPC .............. H04W 72/046; H04W 72/23; H04W 72/0446; H04W 72/0453; H04B 7/0695; H04L 1/08
(Continued)

(56) References Cited

U.S. PATENT DOCUMENTS 10,091,753 B2 * 10/2018 Lee .................. H04W 74/0833
2007/0021059 A1 * 1/2007 Karabinis .......... H04B 7/18543
455/12.1
(Continued)

FOREIGN PATENT DOCUMENTS

CN    102694637 A    9/2012
CN    109802787 A    5/2019
(Continued)

OTHER PUBLICATIONS

International Search Report for corresponding application PCT/CN2020/118246 filed Sep. 28, 2020; Mail date Dec. 31, 2020.
(Continued)

*Primary Examiner* — Frantz Coby
(74) *Attorney, Agent, or Firm* — CANTOR COLBURN LLP

(57) ABSTRACT

Information determination, acquisition and transmission methods, apparatuses and devices, and a storage medium are provided. The information determination method includes: acquiring a target parameter according to a downlink information element and second information, wherein the second
(Continued)

Determine target information according to first information. The first information includes at least one of: a frequency-domain bandwidth group, a control channel resource group, a control channel resource set, and N sets of values of a same type of parameters of an information element, where N is a positive integer, and the target information includes first-type QCL-RS information or first-type pre-coding information ⎯ S110 information includes at least one of: timing advance information, a predetermined parameter, a number of repeated transmissions of an uplink target information element, a time-domain behavior parameter of the uplink target information element, a predetermined Component Carrier (CC) group, and a correspondence relationship between the downlink information element and an uplink target information element, and the target parameter is spatial transmitting filter information of an uplink target information element.

20 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0263024 A1 | 9/2018 | John Wilson et al. | |
| 2019/0141693 A1* | 5/2019 | Guo | H04W 72/1268 |
| 2019/0229792 A1* | 7/2019 | John Wilson | H04L 5/0051 |
| 2021/0067205 A1* | 3/2021 | Manolakos | H04L 5/0053 |
| 2021/0185688 A1* | 6/2021 | Venugopal | H04W 72/1268 |

FOREIGN PATENT DOCUMENTS

| | | | | |
|---|---|---|---|---|
| CN | 110177063 A * | 8/2019 | | H04L 25/021 |
| CN | 110798894 A | 2/2020 | | |
| DE | 102013104564 A1 * | 11/2013 | | H04B 1/3805 |
| WO | WO-2017196398 A1 * | 11/2017 | | H04L 5/0051 |
| WO | 2019130858 A1 | 7/2019 | | |

OTHER PUBLICATIONS

Samsung, "Corrections on UL Beam Management", 3GPP TSG RAN WG1 Meeting #92bis Sanya, China, Apr. 16-20, 2018, R1-1804362.

* cited by examiner

Fig. 1

Determine target information according to first information. The first information includes at least one of: a frequency-domain bandwidth group, a control channel resource group, a control channel resource set, and N sets of values of a same type of parameters of an information element, where N is a positive integer, and the target information includes first-type QCL-RS information or first-type pre-coding information ~ S110

Fig. 2

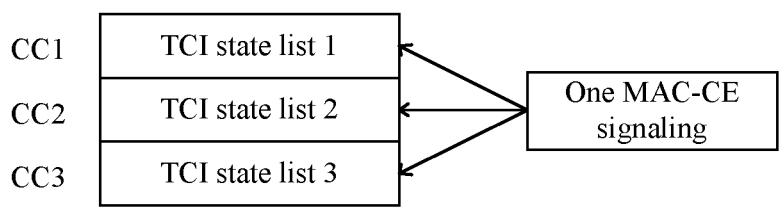

Fig. 3

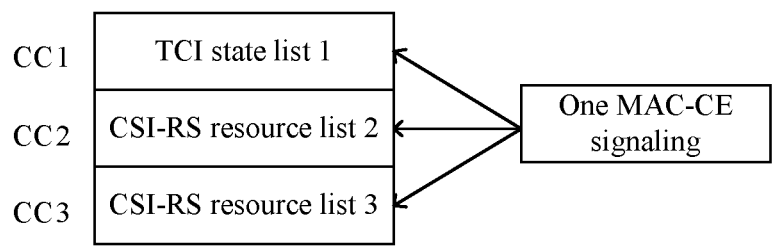

Fig. 4

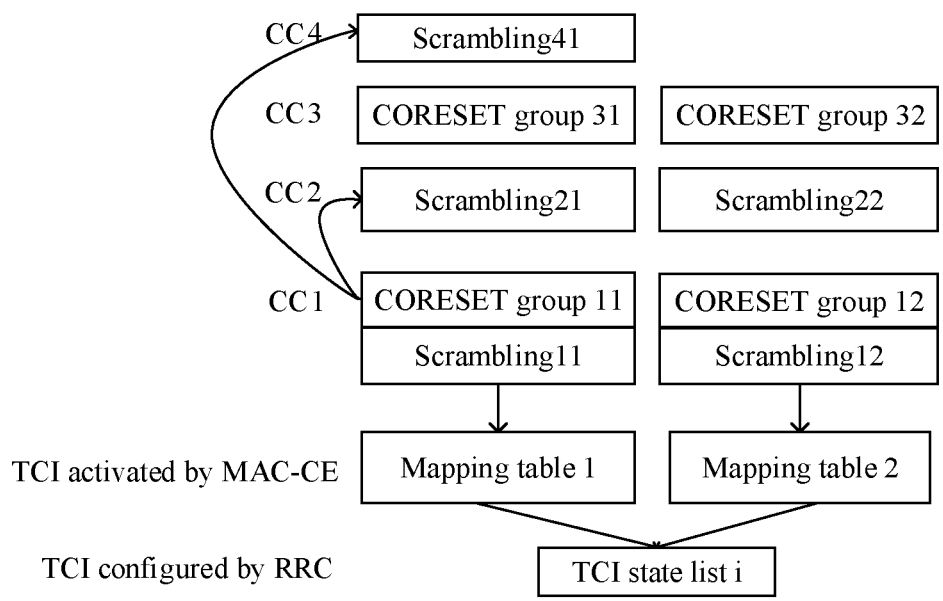

Fig. 9

Acquire a target parameter according to a downlink information element and second information, where the second information includes at least one or more of: timing advance information, a predetermined parameter, a number of repeated transmissions of an uplink target information element, a time-domain behavior parameter of the uplink target information element, a predetermined CC group, and a correspondence relationship between the downlink information element and an uplink target information element, and the target parameter is spatial transmission filter information of an uplink target information element ~ S910

Fig. 10

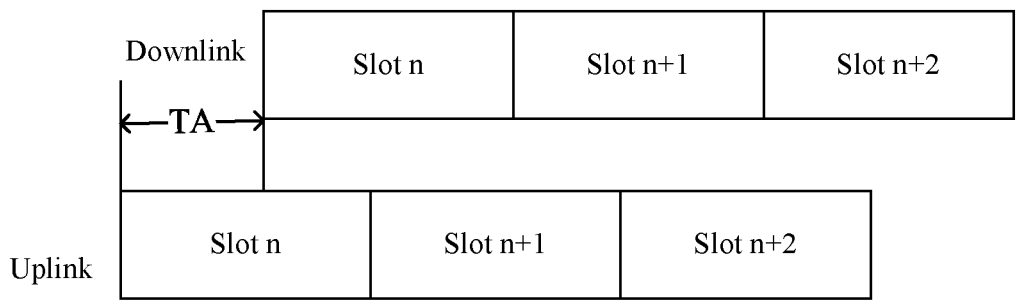

Fig. 11

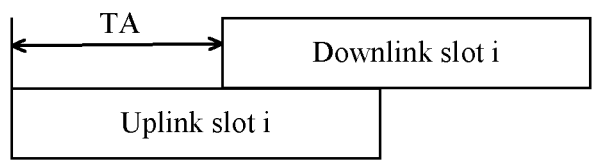

Fig. 12

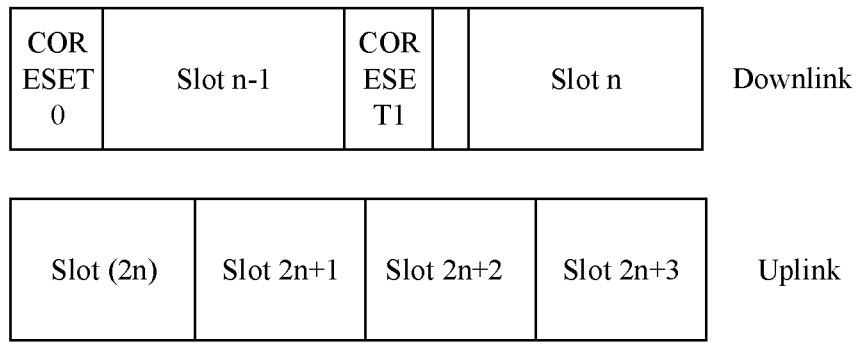

ID
INFORMATION DETERMINATION, ACQUISITION AND TRANSMISSION METHODS, APPARATUSES AND DEVICES, AND STORAGE MEDIUM

CROSS-REFERENCE TO RELATED APPLICATION

The present disclosure is a National Stage Filing of PCT International Application No. PCT/CN2020/118246 filed on Sep. 28, 2020, which claims priority to Chinese Patent Application No. 201910945704.9, filed to the China National Intellectual Property Administration on Sep. 30, 2019, the disclosure of which is hereby incorporated by reference in its entirety.

TECHNICAL FIELD

The present disclosure relates to wireless communication networks, for example, to information determination, acquisition and transmission methods, apparatuses and devices, and a storage medium.

BACKGROUND

In New Radio (NR) Rel-15, more than one Bandwidth Part (BWP) may be configured for one downlink Component Carrier (CC) via Radio Resource Control (RRC) signaling. One Transmission Configuration Indication state (TCI state) list may be configured in each BWP. One TCI state list includes one or more TCI states. One or two reference signals are configured in each TCI state. Each reference signal is associated with a set of Quasi Co-Location (QCL) parameters. Great signaling overhead may be caused in a case where QCL parameters are independently configured for a target information element in each BWP configured for each CC.

SUMMARY

The embodiments of the present disclosure provide information determination, acquisition and transmission methods, apparatuses and devices, and a storage medium, which can reduce signaling overhead.

Some embodiments of the present disclosure provide an information determination method. The method includes the following operation.

Target information is determined according to first information. The first information includes at least one of: a frequency-domain bandwidth group, a control channel resource group, a control channel resource set, and N sets of values of a same type of parameters of an information element, wherein N is a positive integer. The target information includes first-type Quasi Co-Location-Reference Signal (QCL-RS) information or first-type pre-coding information.

Some embodiments of the present disclosure provide an information acquisition method. The method includes the following operation.

A target parameter is acquired according to a downlink information element and second information. The second information includes at least one of: timing advance information, a predetermined parameter, a number of repeated transmissions of an uplink target information element, a time-domain behavior parameter of the uplink target information element, a predetermined Component Carrier (CC) group, and a correspondence relationship between the downlink information element and an uplink target information element. The target parameter is spatial transmitting filter information of an uplink target information element.

Some embodiments of the present disclosure provide an information transmission method. The method includes the following operations.

A time unit in which an aperiodic measurement reference signal resource is located is determined according to third information.

The aperiodic measurement reference signal resource is transmitted in the time unit in which the aperiodic measurement reference signal resource is located.

The third information includes at least one of: a minimum time interval between a PDCCH scheduling the aperiodic measurement reference signal resource and the aperiodic measurement reference signal resource, a first predetermined time interval, slot structure information, a predetermined time window, and a measurement reference signal resource set in which the aperiodic measurement reference signal resource is located.

Some embodiments of the present disclosure provide an information determination apparatus. The apparatus includes a target information determination module.

The target information determination module is configured to determine target information according to first information. The first information includes at least one of: a frequency-domain bandwidth group, a control channel resource group, a control channel resource set, and N sets of values of a same type of parameters of an information element, wherein N is a positive integer. The target information includes first-type QCL-RS information or first-type pre-coding information.

Some embodiments of the present disclosure provide an information acquisition apparatus. The apparatus includes a target parameter acquisition module.

The target parameter acquisition module is configured to acquire a target parameter according to a downlink information element and second information. The second information includes at least one of: timing advance information, a predetermined parameter, a number of repeated transmissions of an uplink target information element, a time-domain behavior parameter of the uplink target information element, a predetermined CC group, and a correspondence relationship between the downlink information element and an uplink target information element. The target parameter is spatial transmitting filter information of an uplink target information element.

Some embodiments of the present disclosure provide an information transmission apparatus. The apparatus includes a time unit determination module and a transmission module.

The time unit determination module is configured to determine, according to third information, a time unit in which an aperiodic measurement reference signal resource is located.

The transmission module is configured to transmit the aperiodic measurement reference signal resource in the time unit in which the aperiodic measurement reference signal resource is located. The third information includes at least one of: a minimum time interval between a PDCCH scheduling the aperiodic measurement reference signal resource and the aperiodic measurement reference signal resource, a first predetermined time interval, slot structure information, a predetermined time window, and a measurement reference signal resource set in which the aperiodic measurement reference signal resource is located.

Some embodiments of the present disclosure provide a device, including:
at least one processor; and
a memory, configured to store at least one program.

The at least one program, when executed by the at least one processor, causes the at least one processor to implement the information determination method, the information acquisition method, or the information transmission method described above.

Some embodiments of the present disclosure provide a storage medium. The storage medium is configured to store a computer program. The computer program is used for implementing any of the methods according to the embodiments of the present disclosure when executed by a processor.

With regard to the above embodiments and other aspects of the present disclosure, as well as implementations thereof, further description is provided in Brief Description of the Drawings, Detailed Description and Claims.

BRIEF DESCRIPTION OF THE DRAWINGS

FIG. 1 is a flowchart of an information determination method provided in some embodiments of the present disclosure.

FIG. 2 is a schematic diagram in which a Media Access Control Element (MAC-CE) signaling corresponds to multiple Transmission Configuration Indication state (TCI state) lists, configured by Radio Resource Control (RRC), of multiple CCs provided in some embodiments of the present disclosure.

FIG. 3 is a schematic diagram of a TCI state mapping table from a same code point to a TCI state index provided in some embodiments of the present disclosure.

FIG. 4 is a schematic diagram in which Physical Downlink Shared Channels (PDSCHs) having a same control resource (CORESET) group identifier or a same scrambling configuration ID correspond to one TCI state mapping table provided in some embodiments of the present disclosure.

FIG. 9 is a schematic flowchart of an information acquisition method provided in some embodiments of the present disclosure.

FIG. 10 is a schematic diagram showing a case where an uplink slot n has a Timing Advance (TA) relative to a downlink slot n provided in some embodiments of the present disclosure.

FIG. 11 is a schematic diagram showing a case where an uplink frame i has a TA relative to a downlink frame i provided in some embodiments of the present disclosure.

FIG. 12 is a schematic diagram of determining a subcarrier spacing of a second time unit in a case where one downlink slot corresponds to two uplink slots provided in some embodiments of the present disclosure.

DETAILED DESCRIPTION

Figure 5:
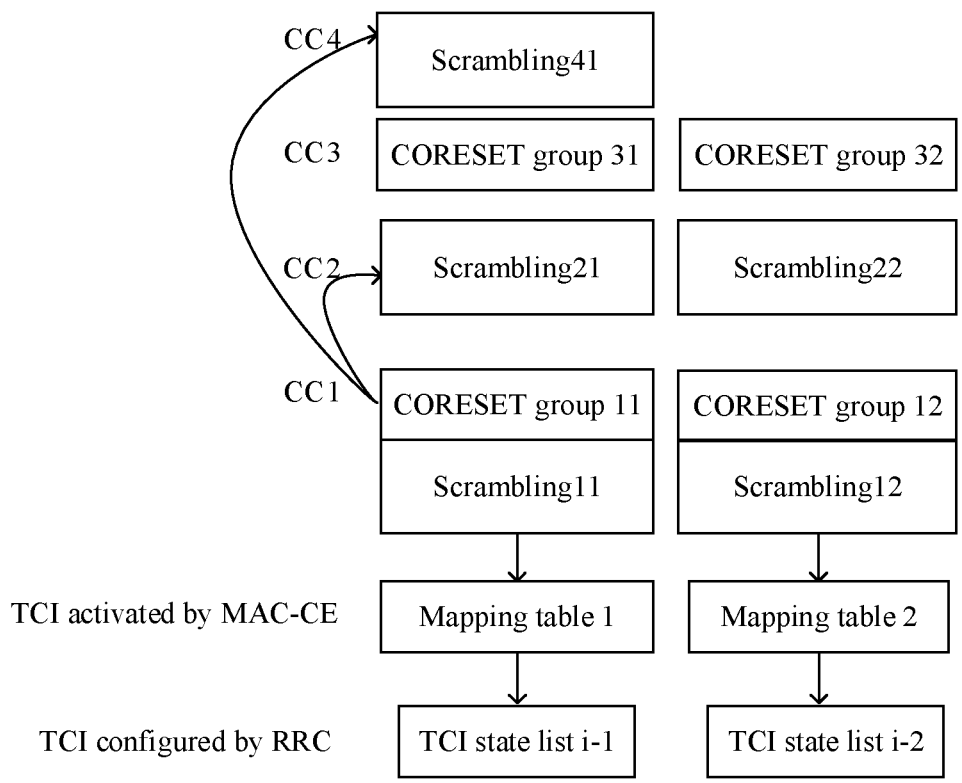
FIG. 5 is a schematic diagram in which PDSCHs having a same CORESET group identifier or a same scrambling configuration ID correspond to one TCI state mapping table provided in some embodiments of the present disclosure.

Embodiments of the present disclosure are described in detail below with reference to the drawings. Operations shown in the flowchart of the drawings may be executed in a computer system, such as a set of computer-executable instructions. In addition, although a logical sequence is shown in the flowchart, in some cases, the operations shown or described may be executed in a different order than here.

In NR Rel-15, more than one BWP may be configured for one downlink serving cell via an RRC signaling. One TCI state list may be configured in each BWP. One TCI state list includes one or more TCI states. One or two QCL-RSs are configured in each TCI state. Each QCL-RS is associated with a set of QCL parameters. Great signaling overhead may be caused in a case where QCL parameters are independently configured for a target information element in each BWP configured for each CC.

Table 1 is a correspondence relationship table among a TCI state index, a QCL-RS and a QCL parameter provided in some embodiments of the present disclosure. As shown in Table 1, in a case where QCL information of a target channel and/or a signal is configured to be TCI state1, it indicates that the target channel and/or the signal are in a QCL relationship with a Channel State Information-Reference Signal 1 (CSI-RS1) with regard to one or more QCL parameters in QCL-type A, and the target channel and/or the signal are in a QCL relationship with Synchronization Signal Black 1 (SSB1) with regard to one or more QCL parameters in QCL-type D. QCL-type A includes at least one or more of the following QCL parameters: Doppler shift, Doppler spread, average delay, or delay spread. QCL-type D includes at least one or more of the following QCL parameters: a spatial receiving parameter (spatial Rx parameter) or average gain.

TABLE 1

| TCI state index | QCL-RS | QCL parameter |
| --- | --- | --- |
| TCI state 1 | CSI-RS1 | QCL-type A |
|  | SSB1 | QCL-type D |

Great signaling overhead may be caused in a case where QCL information is independently configured for the target channel and/or the signal in each BWP configured for each CC. Therefore, how to reduce the configuration overhead and signaling delay of QCL information is a problem to be resolved.

In an exemplary implementation, FIG. 1 is a flowchart of an information determination method provided in some embodiments of the present disclosure. As shown in FIG. 1, the method is applicable to the determination of a transmission manner of an aperiodic measurement reference signal resource. The method may be performed by an information transmission apparatus provided in some embodiments of the present disclosure. The information transmission apparatus may be implemented by software and/or hardware, and integrated on user equipment or a base station.

As shown in FIG. 1, the information determination method according to some embodiments of the present disclosure mainly includes operation S110.

At S110, target information is determined according to first information. The first information includes at least one of: a frequency-domain bandwidth group, a control channel resource group, a control channel resource set, and N sets of values of a same type of parameters of an information element, wherein N is a positive integer. The target information includes first-type QCL-RS information or first-type pre-coding information.

In the embodiments, the information element includes a channel and/or a signal.

It is first to be noted that, a CC in the embodiments of the present disclosure may also be referred to as a serving cell. One frequency-domain bandwidth includes at least one of: one serving cell, one BWP, or one contiguous Physical Resource Block (PRB) set.

In the embodiments of the present disclosure, the control channel resource group represents a CORESET group in one frequency-domain bandwidth. Control channel resources having a same identifier in the control channel resource group and being in one frequency-domain bandwidth form one control channel resource group. The identifier is also used for acquiring HARQ-ACK information. For example, the identifier is configured in each control channel resource via RRC signaling. A default identification number is provided for control channel resources in which the identifier is not configured.

Here, the mapping table may also be referred to as a mapping relationship. An association between two pieces of information includes at least one of: a value of one type of information is acquired according to a value of another type of information; a value range of one type of information is acquired according to a value range of another type of information; a specific value combination of two types of information cannot appear simultaneously; in configuration information of one type of information, another type of information having a correspondence relationship with this type of information is configured; a correspondence relationship between two types of information is determined according to signaling information and/or a predetermined rule; a maximum number of combined values of two types of information cannot exceed a predetermined value; according to the number of values of one type of information, another type of information is determined; there is an association between configuration information of two types of information; and there is an association between two types of information in a case where associated information elements belong to a same time unit.

In the embodiments of the present disclosure, the TCI state may also be referred to as QCL information or other names. In a word, one TCI state includes one or more QCL-RSs, each QCL-RS is associated with a set of QCL parameters, and an intersection among different sets of QCL parameters in one TCI state is null and/or a difference set among different sets of QCL parameters in one TCI state is not null.

In the embodiments of the present disclosure, the TCI state mapping table or parameter information corresponding to one control channel resource group includes the TCI state mapping table or parameter information corresponding to the channel and/or the signal scheduled by control channels in the control channel resources in the control channel resource group.

In the embodiments of the present disclosure, the channel and/or the signal scheduled by the control channel resource group includes a channel and/or a signal scheduled by the control channel in the same control channel resource in the control channel resource group, or channels and/or signals scheduled by the control channels in multiple control channel resources in the control channel resource group.

Here, the control channel resource includes one of the following: a control channel resource set, that is, a frequency-domain resource and a space-domain resource of a downlink control channel resource; a search space set, that is, a time-domain resource and the frequency-domain resource of the downlink control channel resource; a search space corresponding to an aggregation degree, that is, the time-domain resource and the frequency-domain resource of the downlink control channel resource; a time-domain occasion of the search space set, that is, the time-domain resource and the frequency-domain resource of the downlink control channel resource; a frequency-domain resource set of the CORESET, that is, the frequency-domain resource of the downlink control channel resource; a control channel demodulation reference signal port group, that is, the space-domain resource of the downlink control channel resource; the control channel resource corresponding to a QCL-RS set, that is, the space-domain resource of the downlink control channel resource, and the control channel resource included in configuration information of a Physical Downlink Control Channel (PDCCH), that is, the time-domain resource, the frequency-domain resource and the space-domain resource of the downlink control channel resource; a format of Downlink Control Information (DCI) included in the PDCCH, that is, a DCI format resource of the downlink control channel resource; or scrambling information of the PDCCH, that is, a code-domain resource of the downlink control channel resource. The scrambling information of the PDCCH includes Radio Network Temporary Identifier (RNTI) information. The control channel resource set is configured by high-layer parameters.

The configuration information of the PDCCH includes PDCCH-config. The PDCCH-config includes configuration information of the CORESET and control information of the search space.

In an exemplary implementation, the operation of determining the target information according to the first information includes at least one of the following: downlink information elements corresponding to the same value of the first information share the same first-type QCL-RS information; and downlink information elements corresponding to different values of the first information respectively correspond to different first-type QCL-RS information.

In an exemplary implementation, in a case where the target information is the first-type QCL-RS information, the operation of determining the target information according to the first information includes at least one of the following: the control channel resource groups having a same control channel resource group identifier in the frequency-domain bandwidth group correspond to the same first-type QCL-RS information; the control channel resource groups having different control channel resource group identifiers in the frequency-domain bandwidth group respectively correspond to different first-type QCL-RS information; information elements with a same set index of a same type of parameters in the frequency-domain bandwidth group correspond to the same first-type QCL-RS information; information elements with different set indexes of the same type of parameters in the frequency-domain bandwidth group respectively correspond to different first-type QCL-RS information; the first-type QCL-RS information of the information elements is determined according to the control channel resource group identifier, wherein the information elements include information elements scheduled by the control channels in the control channel resource group corresponding to the control channel resource group identifier; or the first-type QCL-RS information of the information elements corresponding to the set indexes of the same type of parameters is determined according to the set indexes of the same type of parameters.

In an exemplary implementation, in a case where the target information is the first-type QCL-RS information, the operation of determining the target information according to the first information includes: in a case where the number of the control channel resource groups configured in any frequency-domain bandwidth in the frequency-domain bandwidth group is less than A, ignoring the first-type QCL-RS information corresponding to the unconfigured control channel resource groups in the frequency-domain bandwidth; and in a case where the number of sets of values of the same type of parameters configured in any frequency-domain bandwidth in the frequency-domain bandwidth group is less than A, ignoring the first-type QCL-RS information corresponding to the unconfigured set indexes of the same type of parameters in the frequency-domain bandwidth, wherein A is an integer greater than or equal to 1.

In an exemplary implementation, in a case where the target information is the first-type QCL-RS information, the operation of determining the target information according to the first information includes: a first information element and a second information element respectively correspond to the respective first-type QCL-RS information. The first information element and the second information element are scheduled by the control channel resources in the same control channel resource group in the frequency-domain bandwidth group. The frequency-domain bandwidth in which the first information element is located belongs to the frequency-domain bandwidth group, and the frequency-domain bandwidth in which the second information element is located does not belong to the frequency-domain bandwidth group.

In an exemplary implementation, in a case where the target information is the first-type QCL-RS information, the operation of determining the target information according to the first information includes at least one of the following: a first type of information elements and a second type of information elements correspond to the same first-type QCL-RS information, wherein the first type of information elements and the second type of information elements are located in different frequency-domain bandwidths in the frequency-domain bandwidth group and are scheduled by the control channel resource group having the same control channel resource group identifier, and the control channel resource group may or may not be located in the frequency-domain bandwidth group; a third type of information elements and a fourth type of information elements respectively correspond to different first-type QCL-RS information, wherein the third type of information elements and the fourth type of information elements are located in different frequency-domain bandwidths in the frequency-domain bandwidth group and are respectively scheduled by the control channel resource group having different control channel resource group identifiers, and the control channel resource group may or may not be located in the frequency-domain bandwidth group; a fifth type of information elements and a sixth type of information elements correspond to the same first-type QCL-RS information, wherein the fifth type of information elements and the sixth type of information elements are located in different frequency-domain bandwidths in the frequency-domain bandwidth group and are scheduled by the control channel resource group having the same control channel resource group identifier, and the control channel resource group is located in the frequency-domain bandwidth group; a seventh type of information elements and a eighth type of information elements respectively correspond to different first-type QCL-RS information, wherein the seventh type of information elements and the eighth type of information elements are located in different frequency-domain bandwidths in the frequency-domain bandwidth group and are respectively scheduled by the control channel resource group having different control channel resource group identifiers, and the control channel resource group is located in the frequency-domain bandwidth group; a ninth type of information elements and a tenth type of information elements correspond to the same first-type QCL-RS information, wherein the ninth type of information elements and the tenth type of information elements are located in different frequency-domain bandwidths in the frequency-domain bandwidth group and correspond to the same set indexes of a same type of parameters in different frequency-domain bandwidths; or an eleventh type of information elements and a twelfth type of information elements respectively correspond to different first-type QCL-RS information, wherein the eleventh type of information elements and the twelfth type of information elements are located in different frequency-domain bandwidths in the frequency-domain bandwidth group and correspond to different set indexes of a same type of parameters in different frequency-domain bandwidths.

In an exemplary implementation, the operation of determining the target information according to the first information includes at least one of the following: downlink information elements corresponding to the same value of the first information share the same first-type QCL-RS information; and downlink information elements corresponding to different values of the first information respectively correspond to different first-type QCL-RS information.

In an exemplary implementation, sharing the same first-type QCL-RS information includes at least one of: sharing a TCI state list configured by RRC signaling, sharing a TCI state mapping table activated by an MAC-CE signaling, sharing a TCI state indicated by a DCI signaling, and sharing an activated TCI state.

In an exemplary implementation, the method includes one of the following: the frequency-domain bandwidth group shares the TCI state list; the control channel resource group having the same control channel resource group identifier in the frequency-domain bandwidth group shares the TCI state list; or the control channel resource groups having different control channel resource group identifiers in the frequency-domain bandwidth group correspond to different TCI state lists. The TCI state list is configured by RRC.

In an exemplary implementation, the control channel resources in the control channel resource set share the TCI state list configured by RRC; and/or the control channel resources in the control channel resource set share the activated TCI state.

In an exemplary implementation, the control channel resource set meets at least one of the following conditions: the control channel resource set includes the control channel resources in at least one or more frequency-domain bandwidths; or the control channel resource set includes the control channel resources in the control channel resource group having the same control channel resource group identifier in the frequency-domain bandwidth group.

In an exemplary implementation, the method includes at least one of the following: a total number of activated or updated TCI states in a set of MAC-CE signaling information is greater than or equal to a maximum number of the TCI states allowed to be activated in the frequency-domain bandwidth; a difference set of the TCI states activated by the set of MAC-CE signaling information in different frequency-domain bandwidths is not null; an intersection of the TCI states activated by the set of MAC-CE signaling information in different frequency-domain bandwidths is not null; or the set of MAC-CE signaling information refers to the TCI state list configured by the RRC signaling corresponding to the frequency-domain bandwidth in each frequency-domain bandwidth of the frequency-domain bandwidth group, and in a case where the TCI state list configured by the RRC signaling corresponding to the frequency-domain bandwidth has no TCI state corresponding to an indication domain, the TCI state corresponding to the indication domain is ignored.

In an exemplary implementation, the method includes at least one of the following: uplink target information elements corresponding to the same value of the first information correspond to a same uplink reference signal set; or uplink target information elements corresponding to different values of the first information respectively correspond to different uplink reference signal sets. The uplink reference signal set is configured by the RRC signaling. First-type pre-coding information of the uplink target information element is selected from the uplink reference signal set by scheduling a control channel of the uplink target information element. The first-type pre-coding information includes at least one or more of a Transmitted Pre-coding Matrix Indicator (TPMI) or a spatial transmitting filter.

In an exemplary implementation, the method includes at least one of the following: uplink target information elements corresponding to the same value of the first information correspond to the same set of the first-type pre-coding information; or uplink target information elements corresponding to different values of the first information respectively correspond to different sets of the first-type pre-coding information.

In an exemplary implementation, the first-type pre-coding information includes at least one of an uplink reference signal set list configured by the RRC signaling, an uplink reference signal set configured by the RRC signaling, an uplink reference signal set activated by the MAC-CE signaling, or an activated uplink reference signal. The pre-coding of the uplink target information element is determined according to the activated uplink reference signal. Alternatively, the pre-coding of the uplink target information element is acquired by scheduling a reference signal selected by the control channel of the uplink target information element from the activated uplink reference signal set.

In an exemplary implementation, the frequency-domain bandwidth group includes one of a BWP group formed by the BWP in a serving cell or a serving cell group formed by at least two serving cells.

In an exemplary implementation, the control channel resource includes at least one of CORESET, a search space, or a DCI format.

In an exemplary implementation, the method includes at least one of the following: the information elements corresponding to the same first information in the different frequency-domain bandwidths in the frequency-domain bandwidth group share updated or activated signaling information of the target information; the frequency-domain bandwidth in which the information elements are located scheduled by the control channel resource in any frequency-domain bandwidth in the frequency-domain bandwidth group belongs to the frequency-domain bandwidth group; the number of the control channel resource groups included in each frequency-domain bandwidth in the frequency-domain bandwidth group is the same; the number of the control channel resource groups included in each frequency-domain bandwidth in the frequency-domain bandwidth group is less than a first predetermined threshold; the number of sets of values of the same type of parameters included in each frequency-domain bandwidth in the frequency-domain bandwidth group is the same; the number of sets of values of the same type of parameters included in each frequency-domain bandwidth in the frequency-domain bandwidth group is less than a second predetermined threshold; in a case where any control channel scheduling the information elements in the frequency-domain bandwidth does not include an indication domain of the first-type QCL-RS information, the shared first-type QCL-RS information corresponding to the frequency-domain bandwidth group is ignored in the frequency-domain bandwidth, wherein the frequency-domain bandwidth belongs to the frequency-domain bandwidth group; in a case where any control channel scheduling the information elements in the frequency-domain bandwidth and belonging to the control channel resource group does not include the indication domain of the first-type QCL-RS information of the information elements, the shared first-type QCL-RS information corresponding to the control channel resource group of the frequency-domain bandwidth group is ignored in the frequency-domain bandwidth; the control channel resource group is the control channel resource group in any frequency-domain bandwidth in the frequency-domain bandwidth group; the information element is the information element in any frequency-domain bandwidth in the frequency-domain bandwidth group; a set of values of the same type of parameters corresponds to the information element in any frequency-domain bandwidth in the frequency-domain bandwidth group; the first-type QCL-RS information includes the TCI state mapping table, the TCI state mapping table includes a mapping relationship between a code point of a TCI indication domain in DCI and the TCI state index, and the QCL-RS of the information element is acquired according to the value of the TCI indication domain indicated in a physical layer control channel scheduling the information element and the TCI state mapping table of the information element; and the first-type QCL-RS information includes one TCI state or multiple TCI states, and the QCL-RS of the information element includes a TCI state in the one TCI state or the multiple TCI states.

In an exemplary implementation, the TCI state mapping table meets at least one of the following: the control channel resource groups with the same control channel resource group identifier in different frequency-domain bandwidths in the frequency-domain bandwidth group share the same TCI state mapping table; the information elements with the same set index of the same type of parameters in different frequency-domain bandwidths in the frequency-domain bandwidth group share the same TCI state mapping table; the TCI state mapping table is an acquisition parameter of a QCL-RS of a downlink data channel in the frequency-domain bandwidth in the frequency-domain bandwidth group; different TCI state mapping tables are activated or updated by the MAC-CE signaling, or different TCI state mapping tables are respectively activated or updated by different signaling portions of the MAC-CE signaling, wherein the different TCI state mapping tables correspond to different control channel resource groups of the frequency-domain bandwidth group, or the different TCI state mapping tables correspond to different set indexes of a same type of parameters of the frequency-domain bandwidth group; or multiple frequency-domain bandwidths in the frequency-domain bandwidth group share the TCI state mapping table, including the same TCI state index in the TCI state mapping table corresponding to different TCI state lists in the different frequency-domain bandwidths, or the QCL-RS of the first type of QCL parameters associated with the same TCI state index in the TCI state mapping table corresponds to the reference signal in the frequency-domain bandwidth in each frequency-domain bandwidth, a reference signal resource index corresponding to the reference signal differs by a predetermined value, and the predetermined value is an integer.

In an exemplary implementation, the method includes at least one of the following: a difference set between sets of the TCI states included in the TCI state lists of different frequency-domain bandwidths in the frequency-domain bandwidth group is null; an intersection of the sets of the TCI states included in the TCI state lists of different frequency-domain bandwidths in the frequency-domain bandwidth group is not null; or TCI states included in a predetermined TCI state list belong to the set of the TCI states included in the TCI state list in each frequency-domain bandwidth in the frequency-domain bandwidth group. A frequency-domain bandwidth index corresponding to the predetermined TCI state list is included in the MAC-CE signaling for updating or activating the TCI state mapping table.

In an exemplary implementation, the first type of QCL parameters includes at least one of Doppler shift, Doppler spread, average delay, delay spread, a spatial receiving parameter (spatial Rx parameter) or average gain.

In an exemplary implementation, for the configuration of the TCI state of a Demodulation Reference Signal (DMRS) of PDSCH in the BWP, a three-layer signaling structure is adopted. That is to say, the RRC signaling configures the TCI state list in each BWP, and the TCI state list includes one or more TCI states. Then, the corresponding TCI states are activated for up to X code points in each BWP by means of the MAC-CE signaling. The MAC-CE signaling activates up to Y TCI states for one code point. X is a maximum number of state values corresponding to a bit domain (for example, a TCI bit domain) indicating QCL information in DCI. One code point corresponds to one bit domain value of a TCI domain in DCI.

Table 2 is a list of a correspondence relationship between the code point and the TCI state provided in some embodiments of the present disclosure. As shown in Table 2, the TCI domain in DCI is 3 bits, MAC-CE activates the corresponding TCI states for 8 code points, and in Table 2, X=8, Y=2. In the embodiments of the present disclosure, the values of X and Y are merely provided as an example, and are not limited to the specific values.

TABLE 2

| Value of code point in DCI | TCI state activated by MAC-CE |
|---|---|
| 000 | TCI state18 |
| 001 | TCI state3, TCI state4 |
| 010 | TCI state5 |
| 011 | TCI state6 |
| 100 | TCI state7 |
| 101 | TCI state23, TCI state58 |
| 110 | TCI state44 |
| 111 | TCI state127 |

Therefore, under a Carrier Aggregation (CA) mode, it is required to configure the TCI state list for each BWP in each CC, and further required to respectively use the MAC-CE signaling to activate the TCI state set corresponding to the code point for each BWP of each CC. As shown in Table 2, the TCI states corresponding to all of 8 code points form the TCI state set. However, signaling overhead is very large. In addition, multiple MAC-CE signaling are involved, and signaling delay is relatively large.

On the other hand, the TCI state is related to a transmission beam. Different TCI states may represent different transmission beams. Multiple CC transmission beams are usually consistent. Therefore, the MAC-CE signaling may be used to activate the same TCI state set for the multiple CC, that is, the TCI state mapping table. In this way, each BWP in the multiple CC may share the TCI state mapping table to correspond to the same MAC-CE signaling. That is to say, the MAC-CE signaling is the same for all of the beams selected by the CC. However, there is a problem that the spatial receiving parameter (spatial Rx parameter) of the target channel and/or the signal in one CC, Doppler shift, and the QCL-RS of average delay may be located in other CC, but the QCL-RS associated with Doppler spread cannot be located in other CC. Therefore, in a case where the MAC-CE signaling activates the same TCI state set for multiple BWP, the multiple BWP belong to one CC or the multiple CC, as shown in Table 2, a set of MAC-CE signaling activates the TCI state mapping table shown in Table 2 for each BWP in the multiple BWP, and the mapping relationship between the code point shown in Table 2 and the TCI state is also activated.

In the embodiments of the present disclosure, Table 2 is referred to as the TCI state mapping table. The TCI state mapping table of the code point and the TCI state corresponding to PDSCH in each BWP in the multiple BWP is shown in Table 2. The set of MAC-CE signaling only activates the TCI state indexes in Table 2. The TCI states corresponding to the TCI state indexes correspond to the TCI states having the TCI state indexes in the TCI state list in respective CC or BWP.

FIG. 2 is a schematic diagram in which an MAC-CE signaling corresponds to multiple TCI state lists, configured by RRC, of multiple CCs provided in some embodiments of the present disclosure. As shown in FIG. 2, the set of MAC-CE signaling corresponds to the frequency-domain bandwidth group {CC1, CC2, CC3}. The set of MAC-CE signaling activates the TCI state mapping table of the code points and the TCI states shown in Table 2. The set of MAC-CE signaling includes one or more MAC-CE signaling. The multiple MAC-CE signaling occurs because the number of TCI states corresponding to one code point is greater than 1. However, the TCI states in the TCI state mapping table referenced by PDSCH in each CC is the TCI states corresponding to the TCI state indexes that map Table 2 to the TCI state lists configured in respective BWP or CC. Table 3 is a TCI state mapping table of PDSCH in CC1 provided in some embodiments of the present disclosure. For example, TCI states in the TCI state mapping table of PDSCH in CC1 are TCI states in a TCI state list 1.

TABLE 3

| Value of code point in DCI | TCI state activated by MAC-CE |
| --- | --- |
| 000 | TCI state18 in TCI state list 1 |
| 001 | TCI state3, TCI stated in TCI state list 1 |
| 010 | TCI state5 in TCI state list 1 |
| 011 | TCI state6 in TCI state list 1 |
| 100 | TCI state7 in TCI state list 1 |
| 101 | TCI state23, TCI state58 in TCI state list 1 |
| 110 | TCI state44 in TCI state list 1 |
| 111 | TCI state127 in TCI state list 1 |

Table 4 is a TCI state mapping table of PDSCH in CC2 provided in some embodiments of the present disclosure. For example, TCI states in the TCI state mapping table of PDSCH in CC2 are TCI states in a TCI state list 2.

TABLE 4

| Value of code point in DCI | TCI state activated by MAC-CE |
| --- | --- |
| 000 | TCI state18 in TCI state list 2 |
| 001 | TCI state3, TCI stated in TCI state list 2 |
| 010 | TCI state5 in TCI state list 2 |
| 011 | TCI state6 in TCI state list 2 |
| 100 | TCI state7 in TCI state list 2 |
| 101 | TCI state23, TCI state58 in TCI state list 2 |
| 110 | TCI state44 in TCI state list 2 |
| 111 | TCI state127 in TCI state list 2 |

Table 5 is a TCI state mapping table of PDSCH in CC3 provided in some embodiments of the present disclosure. For example, TCI states in the TCI state mapping table of PDSCH in CC3 are TCI states in a TCI state list 3.

TABLE 5

| Value of code point in DCI | TCI state activated by MAC-CE |
| --- | --- |
| 000 | TCI state18 in TCI state list 3 |
| 001 | TCI state3, TCI stated in TCI state list 3 |
| 010 | TCI state5 in TCI state list 3 |
| 011 | TCI state6 in TCI state list 3 |
| 100 | TCI state7 in TCI state list 3 |
| 101 | TCI state23, TCI state58 in TCI state list 3 |
| 110 | TCI state44 in TCI state list 3 |
| 111 | TCI state127 in TCI state list 3 |

From Table 3 to Table 5, it may be learned that, in a case where the frequency-domain bandwidth group {CC1, CC2, CC3} shares the set of MAC-CE signaling, the MAC-CE signaling only indicates an index of the TCI state. That the TCI state index is from which TCI state of the TCI state list comes depends on the TCI state list configured in the BWP or the CC in which the PDSCH is located.

FIG. 2 is a schematic diagram of a TCI state mapping table from a same code point to a TCI state index provided in some embodiments of the present disclosure. As shown in FIG. 2, one piece of MAC-CE signaling activates the TCI state mapping table from the same code point to the TCI state index for the multiple frequency-domain bandwidths. The TCI state list belonged to the TCI state corresponding to the TCI state index is a TCI state list configured in the frequency-domain bandwidth in which the PDSCH is located.

FIG. 3 is a schematic diagram of a TCI state mapping table from a same code point to a TCI state index provided in some embodiments of the present disclosure. As shown in FIG. 3, it is another method that the multiple frequency-domain bandwidths share one set of MAC-CE signaling. The TCI state index activated in an MAC-CE command corresponds to the TCI state mapping table in the predetermined CC. for example, the MAC-CE activates the TCI state mapping table shown in Table 2. The TCI state corresponding to the TCI state index in Table 2 is from the TCI state list 1. {CC2, CC3} also refers to Table 2 to acquire the TCI state mapping table. However, the TCI state list is not configured in high-level signaling of CC2, CC3, and the TCI state mapping table in {CC2, CC3} is acquired according to QCL-RS included in each TCI state in the TCI state list 1.

For example, the QCL-RS corresponding to each code point of each CC in {CC2, CC3} belongs to the current CC, that is, CC2 or CC3. In addition, there is a correspondence relationship between QCL-RS resources of the QCL-RS and the code point in CC1. For example, a type of the QCL-RS corresponding to the same code point in each frequency-domain bandwidth is the same, a resource index is the same, or there is a predetermined deviation in the resource index. For example, the MAC-CE activates the TCI state mapping table shown in Table 2. The TCI state index in Table 2 is a TCI state index in the TCI state list 1. The TCI state mapping table referenced by the PDSCH in CC2 is acquired according to the following method. The TCI state is first acquired in the TCI state list 1 according to the TCI state index corresponding to each code point in Table 2. A corresponding QCL-RS 2 in the code point in CC2 is acquired according to a QCL-RS 1 included in the TCI state. The QCL-RS 1 is in CC1, and the QCL-RS 2 is in CC2. Only the resource indexes of the QCL-RS 1 and the QCL-RS 2 are the same, or a difference value of the resource indexes is a predetermined value.

Table 6 is a correspondence relationship table of the TCI state index, the QCL-RS and the QCL parameter provided in some embodiments of the present disclosure. Table 7 is a correspondence relationship table of the TCI state index, the QCL-RS and the QCL parameter provided in some embodiments of the present disclosure. For example, TCI state18 configured in the TCI state list 1 is shown in Table 6. The QCL-RS in Table 6 belongs to CC1. Then, the QCL-RS corresponding to a code point '000' in CC2 is shown in Table 7. CSI-RS25 in Table 7 belongs to CC2, and CSI-RS25 in Table 6 belongs to CC1. SSB23 in Table 6 and Table 7 may respectively belong to CC1 and CC2, or may be the SSB23 only in CC1, as the target channel and/or the signal and the QCL-RS with regard to QCL-Type D may be located in different CC.

TABLE 6

| TCI state index | QCL-RS | QCL parameter |
|---|---|---|
| TCI state18 | CSI-RS25 SSB23 | QCL-type A QCL-type D |

TABLE 7

| TCI state index | QCL-RS | QCL parameter |
|---|---|---|
| TCI state18 | CSI-RS25 SSB23 | QCL-type A QCL-type D |

As described in the above, one piece of MAC-CE signaling corresponds to one CC group. After the MAC-CE signaling is updated, the TCI state mapping table between the code point and the TCI state of each CC in the CC group is updated. Here, a situation that the TCI state mapping table corresponds to more than one piece of MAC-CE signaling is not excluded. For example, the first MAC-CE signaling is used for activating the first TCI state corresponding to the code point, and the second MAC-CE signaling is used for activating the second TCI state corresponding to the code point. As shown in Table 2, certain code points only correspond to one TCI state.

The above method is that the CC in the CC group shares the TCI state mapping table between the code point and the TCI state. The TCI state mapping table is activated by the MAC-CE signaling. The QCL-RS in the TCI state mapping table associated with QCL-Type A and the target channel and/or the signal belong to the same frequency-domain bandwidth.

In a case where two CORESET groups are configured in one CC, each CORESET group corresponds to one TCI state mapping table, that is, each CORESET group corresponds to one set of MAC-CE updated signaling. The QCL-RS for scheduling the PDSCH in each CORESET group refers to the TCI state mapping table corresponding to the CORESET group.

FIG. 4 is a schematic diagram in which PDSCHs having a same CORESET group identifier or a same scrambling configuration ID correspond to one TCI state mapping table provided in some embodiments of the present disclosure. As shown in FIG. 4, a frequency-domain bandwidth group {CC1, CC2, CC3, CC4} shares the MAC-CE signaling. The CORESET having the same CORESET group identifier in the CC group shares the MAC-CE signaling. The MAC-CE signaling is used for activating or updating the TCI state mapping table between the code point and the TCI state. The PDSCH refers to the TCI state mapping table and a code point value notified in DCI to acquire the TCI state corresponding to DMRS of the PDSCH.

Different CORESET groups in the CC group correspond to different TCI state mapping tables. The different TCI state mapping tables are activated or updated by different MAC-CE signaling. In this case, the CORESET having the same CORESET group identifier in the CC group shares the MAC-CE signaling, and the different CORESET groups correspond to different MAC-CE signaling.

The different TCI state mapping tables may further be activated or updated by the same MAC-CE signaling. In this case, the CORESET having the same CORESET group identifier in the CC group shares a portion corresponding to a mapping table in the MAC-CE signaling, and the different CORESET groups correspond to portions corresponding to different mapping tables in the MAC-CE signaling.

FIG. 5 is a schematic diagram in which PDSCHs having a same CORESET group identifier or a same scrambling configuration ID correspond to one TCI state mapping table provided in some embodiments of the present disclosure. As shown in FIG. 5, {a CORESET group 11 in CC1, a CORESET group 31 in CC3} corresponds to the TCI state mapping table 1, and {a CORESET group 12 in CC1, a CORESET group 32 in CC3} corresponds to the TCI state mapping table 2. The CC1 schedules the CC2 and the CC3. The BWP in the CC2 corresponds to two channel scrambling sequences {scrambling21, scrambling22}. The channel scrambling sequence of the PDSCH in the CC2 scheduled by the PDCCH in the CORESET group 1 of the CC1 is generated by using scrambling21. The channel scrambling sequence of the PDSCH in the CC2 scheduled by the PDCCH in the CORESET group 2 of the CC1 is generated by using scrambling22. For example, the channel scrambling sequence is a Pseudo-Random (PN) sequence, and an initialization value of the PN sequence is acquired by using the following formula.

$$C_{init}=n_{RNTI}\cdot 2^{15}+q\cdot 2^{14}+n_{ID}$$

Where $n_{RNTI}$ is an RNTI number corresponding to the PDSCH, and $n_{ID}$ equals the above scrambling21 or the scrambling22. Therefore, the PDSCH scrambled by the scrambling21 in the CC2 refers to the TCI state mapping table 1 to acquire the QCL-RS. The PDSCH scrambled by the scrambling22 in the CC2 refers to the TCI state mapping table 2 to acquire the QCL-RS. However, only a scrambling sequence parameter {scrambling41} is configured in the CC4. The PDSCH scrambled by the scrambling41 in the CC4 corresponds to the TCI state mapping table 1, and the portion of the MAC-CE signaling corresponding to the TCI state mapping table 2 is ignored in the CC4.

In a case where a method that the frequency-domain bandwidth group shares activated or updated MAC-CE signaling of the TCI state mapping table shown in FIG. 2 is adopted, for the PDSCH in each CC in {CC1, CC2, CC3, CC4}, the activated or updated TCI states in the two pieces of MAC-CE signaling that activate or update the two TCI state mapping tables are from the TCI state list configured by the same RRC signaling. That is to say, the TCI states are from any of the TCI state lists i configured in the CC in which the PDSCH is located, wherein i=1, 2, 3, 4, and i is an index of the CC in which the PDSCH is located. Each CC index corresponds to one TCI state list.

In an exemplary embodiment, FIG. 5 is a schematic diagram of a TCI state mapping table corresponding to PDSCH in multiple CC provided in some embodiments of the present disclosure. As shown in FIG. 5, the PDSCH having the same CORESET group identifier or the same scrambling configuration ID in the multiple CC corresponds to one TCI state mapping table. The TCI states activated in the different TCI state mapping tables correspond to different TCI state lists.

The activated or updated TCI states in the two pieces of MAC-CE signaling that activate or update the two TCI state mapping tables are from different TCI state lists configured by the RRC signaling. As shown in FIG. 5, the TCI state set in the MAC-CE signaling corresponding to the TCI state mapping table 1 belongs to a TCI state list i-1, and the TCI state set in the MAC-CE signaling corresponding to the TCI state mapping table 2 belongs to a TCI state list i-2. That is to say, the RRC signaling configures two TCI state lists for each CC in the CC group, and the two TCI state lists respectively correspond to different CORESET groups. Alternatively, the RRC signaling configures two TCI state lists for one CC group. The two TCI state lists respectively correspond to different CORESET groups, and the TCI state list is not required to be configured for each CC in the CC group.

Figure 6:
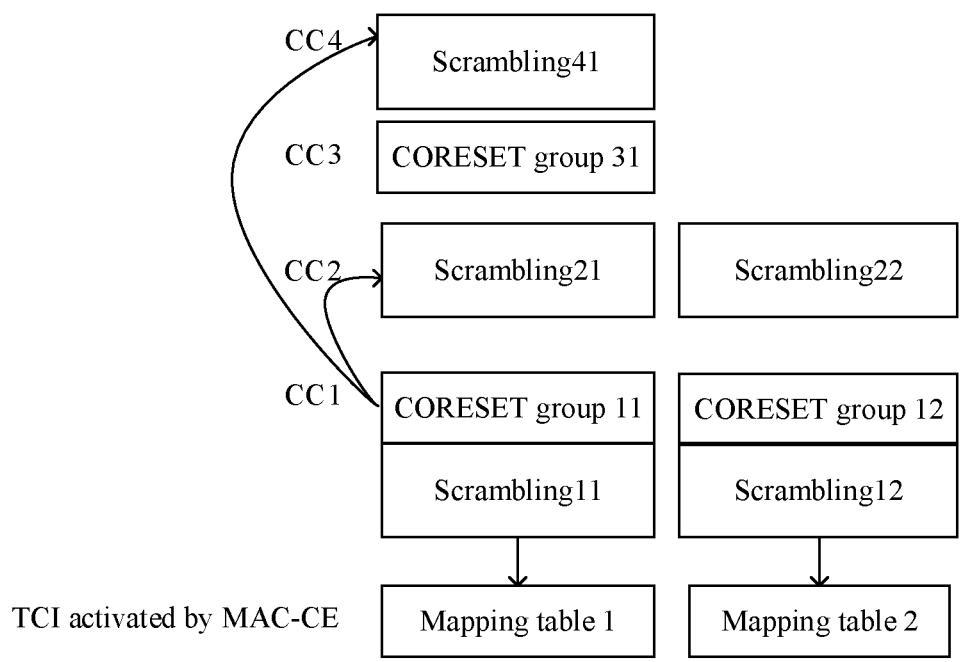
FIG. 6 is a schematic diagram of determining a TCI state mapping table according to a scrambling configuration ID or a CORESET group ID in a CC provided in some embodiments of the present disclosure.

FIG. 6 is a schematic diagram of determining a TCI state mapping table according to a scrambling configuration ID or a CORESET group ID in a CC provided in some embodiments of the present disclosure. As shown in FIG. 6, only one CORESET group CORESET31 is configured in CC3. In a case where {CC1, CC2, CC3, CC4} shares the TCI state mapping table of the PDSCH to activate or update the MAC-CE signaling, a portion in the MAC-CE signaling corresponding to the TCI state mapping table 2 is ignored in CC3. Only a channel scrambling parameter scrambling4*l* is configured in CC4, so that a portion in the MAC-CE signaling corresponding to the TCI state mapping table 2 is ignored in CC4.

Figure 7:
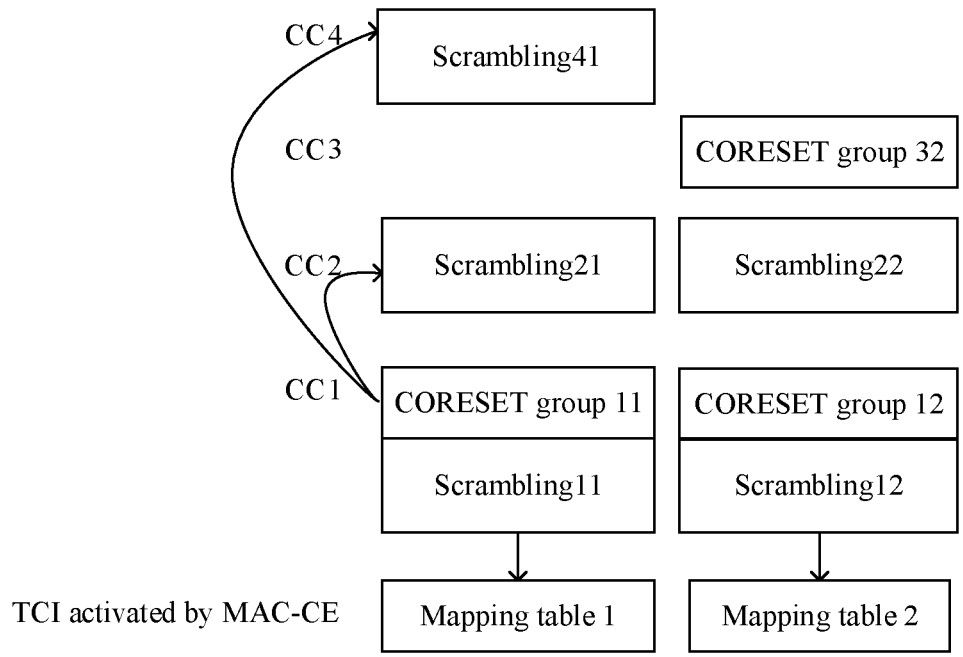
FIG. 7 is a schematic diagram of determining a TCI state mapping table according to a scrambling configuration ID or a CORESET group ID in a CC provided in some embodiments of the present disclosure.

FIG. 7 is a schematic diagram of determining a TCI state mapping table according to a scrambling configuration ID or a CORESET group ID in a CC provided in some embodiments of the present disclosure. As shown in FIG. 7, only one CORESET group CORESET32 is configured in CC3, so that a portion in the MAC-CE signaling corresponding to the TCI state mapping table 1 is ignored in CC3. Only one scrambling4*l* is configured in CC4, so that a portion in the MAC-CE signaling corresponding to the TCI state mapping table 2 is ignored in CC4.

Figure 8:
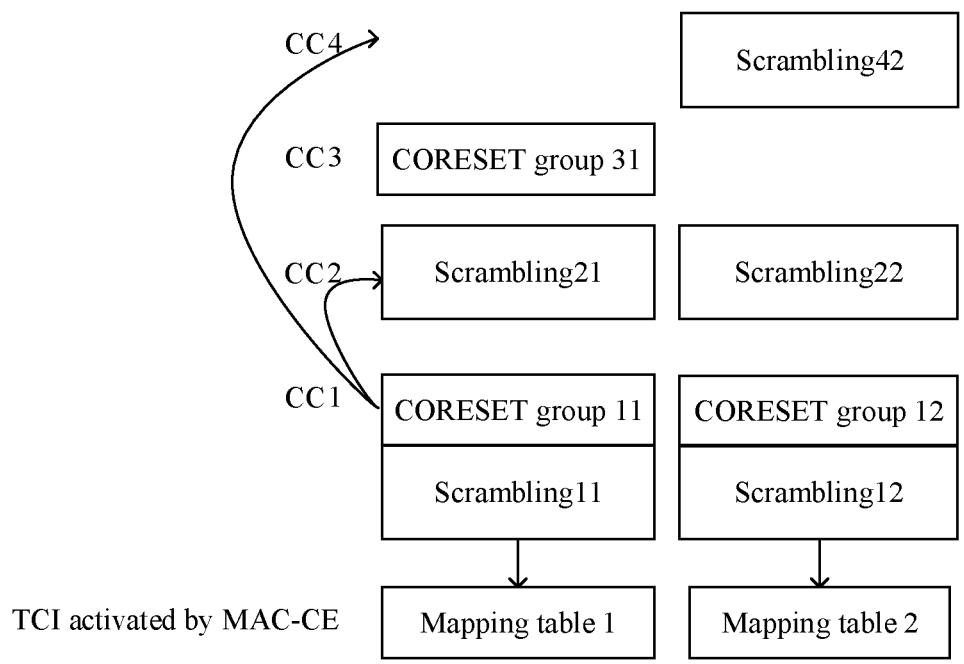
FIG. 8 is a schematic diagram of determining a TCI state mapping table according to a scrambling configuration ID or a CORESET group ID in a CC provided in some embodiments of the present disclosure.

FIG. 8 is a schematic diagram of determining a TCI state mapping table according to a scrambling configuration ID or a CORESET group ID in a CC provided in some embodiments of the present disclosure. As shown in FIG. 8, only one CORESET group CORESET31 is configured in CC3, so that a portion in the MAC-CE signaling corresponding to the TCI state mapping table 2 is ignored in CC3. Only one scrambling42 is configured in CC4, so that a portion in the MAC-CE signaling corresponding to the TCI state mapping table 1 is ignored in CC4.

In a word, in a case where the frequency-domain bandwidth group shares the activated or updated MAC-CE signaling of the TCI state mapping table, the number of the activated TCI state mapping tables is determined according to a maximum number of the CORESET groups included in each CC in the CC group. In a case where there is the CORESET configured in the CC in the CC group, the TCI state mapping table corresponding to the CORESET group is determined according to a CORESET group index. In a case where the PDSCH in the CC in the CC group is scheduled across CC by PDCCH in other CC, there is a correspondence relationship between different CORESET groups in the CC in which the PDCCH is located and different values of the PDSCH parameters of the CC in which the scheduled PDSCH is located. The TCI state mapping table corresponding to the PDSCH corresponding to configuration indexes of the same type of parameter values is determined according to configuration indexes of different values of the same type of parameters of the PDSCH. In a case where the number of the CORESET groups configured in the CC in the CC group is less than the maximum number of the CORESET groups, a portion of the unconfigured CORESET group corresponding to the shared MAC-CE signaling is ignored in the current CC. Alternatively, in a case where the PDSCH of the CC in the CC group is scheduled across the CC by other CC, and the number of parameters (such as scrambling) of the PDSCH configured in the CC is less than the maximum number of the CORESET groups, a portion of the configuration index of the parameter value in the shared MAC-CE signaling corresponding to the unconfigured PDSCH is ignored in the current CC. Alternatively, the PDCCH in the CORESET configured in all of the CORESET of the frequency-domain bandwidth in the frequency-domain bandwidth group does not include a TCI indication domain, and then the activated or updated signaling of the CORESET group corresponding to the mapping table is ignored in the frequency-domain bandwidth. The CORESET of the frequency-domain bandwidth includes the CORESET located in the frequency-domain bandwidth, or may be the CORESET located in other frequency-domain bandwidths and scheduling the PDSCH in the frequency-domain bandwidth. That is to say, the PDCCH scheduling the PDSCH and the PDSCH are located in different frequency-domain bandwidths.

In another implementation that the frequency-domain bandwidth group shares the activated or updated MAC-CE signaling of the TCI state mapping table, the number of the CORESET groups configured in all of the frequency-domain bandwidths in the frequency-domain bandwidth group is required to be the same, for example, the number is 1 or 2.

One or more values of the same type of parameters are configured in or correspond to the CC, which indicates that one or more values of the same type of parameters are configured in or correspond to the BWP in the CC, for example, the currently activated BWP. For example, one or two scrambling/CORESET groups/TCI state lists are configured in or correspond to the CC, which indicates that one or two scrambling/CORESET groups/TCI state lists are configured in or correspond to the BWP in the CC.

In FIGS. 5 to 8, the same type of parameters of the PDSCH uses a channel scrambling parameter scrambling as an example. Definitely, other parameters of the PDSCH are not excluded in the embodiments, such as one or more of the following parameters: process number set information, demodulation reference signal information, an uplink control channel resource group in which HARQ-ACK of the PDSCH is located, rate matching information, aperiodic measurement reference signal information, or downlink data channel information of semi-persistent transmission.

In an exemplary implementation, the frequency-domain bandwidth group shares an activated or updated MAC-CE command of the TCI state mapping table. The maximum number of activated TCI states in the activated MAC-CE command is greater than the maximum number of the TCI states that are allowed to be activated in the frequency-domain bandwidth. As shown in the above embodiments, the frequency-domain bandwidth group shares an activated or updated MAC-CE command of the TCI state mapping table. However, as shown in FIG. 2, the TCI states belonged to the activated TCI states in the MAC-CE command are respectively from each CC. On the other hand, a TCI state index included in the TCI state list in each CC is different, excluding the TCI state in the TCI state list corresponding to the frequency-domain bandwidth. For the frequency-domain bandwidth, an activated or deactivated indication domain in the shared MAC-CE command corresponding to the TCI state is ignored. For example, the MAC-CE command in the frequency-domain bandwidth may activate up to X TCI states. The shared MAC-CE of the frequency-domain bandwidth group may activate up to X TCI states. Only the maximum number of the TCI states that can be activated cannot exceed X.

For example, the TCI state list in the CC1 includes {TCI state1 to TCI state64, TCI state69 to TCI state127}. The TCI state list in the CC1 includes {TCI state1 to TCI state68}, and the shared MAC-CE command activates {TCI1, TCI2, TCI5, TCI8, TCI50, TCI65, TCI66, TCI67, TCI100, TCI101, TCI102}, so that an activated TCI state set corresponding to the activated TCI state mapping table in the CC1 is {TCI1, TCI2, TCI5, TCI8, TCI50, TCI100, TCI101, TCI102}, and an activated TCI state set corresponding to the activated TCI state mapping table in the CC2 is {TCI1, TCI2, TCI5, TCI8, TCI50, TCI65, TCI66, TCI67}.

In a second implementation of the embodiments, the frequency-domain bandwidth group shares an activated or updated MAC-CE command of the TCI state mapping table. The maximum number of activated TCI states in the activated MAC-CE command equals the maximum number of the TCI states that are allowed to be activated in the frequency-domain bandwidth. A difference set of the TCI state indexes included in the TCI state list activated by the RRC signaling in all of the frequency-domain bandwidths in the frequency-domain bandwidth group is required to be null, and an intersection is not null.

In an exemplary implementation, in a case where the number of the CORESET groups configured in the frequency-domain bandwidth is larger, the maximum number of the TCI states that are allowed to be activated in the frequency-domain bandwidth is larger. When scheduling across the CC is achieved, the number of the CORESET groups configured in the frequency-domain bandwidth in which the PDCCH is located is larger, then the maximum number of the TCI states that are allowed to be activated in the frequency-domain bandwidth in which the PDSCH is located is larger.

For example, the maximum number of the TCI states that are allowed to be activated in the frequency-domain bandwidth is in direct proportion to the number of the CORESET groups configured in the frequency-domain bandwidth, or is in direct proportion to the number of the CORESET groups configured in the frequency-domain bandwidth in which the PDCCH scheduling the PDSCH in the frequency-domain bandwidth is located.

In an exemplary implementation, in a case where the maximum number of the TCI states corresponding to the code point of the TCI indication domain in DCI of the frequency-domain bandwidth is larger, the maximum number of the TCI states that are allowed to be activated in the frequency-domain bandwidth is larger. The DCI schedules the PDSCH in the frequency-domain bandwidth. For example, in the TCI state mapping table corresponding to the TCI indication domain in the DCI, as shown in Table 8, the maximum number of the TCI states corresponding to the code point is 1, then the maximum number of the TCI states that are allowed to be activated in the frequency-domain bandwidth is the number of valid code points. As shown in Table 9, the maximum number of the TCI states corresponding to the code point is 2, then the maximum number of the TCI states that are allowed to be activated in the frequency-domain bandwidth is the number of valid code points multiplied by 2. The number of valid code points represents the number of the code points corresponding to the activated TCI states. Table 8 is a correspondence relationship table between the code point and the TCI state activated by MAC-CE provided in some embodiments of the present disclosure. Table 9 is a correspondence relationship table between the code point and the TCI state activated by MAC-CE provided in some embodiments of the present disclosure. In Table 8 and Table 9, although the number of bits in the TCI indication domain in the DCI is 3, the number of the valid code points is 4.

TABLE 8

| Value of code point in DCI | TCI state activated by MAC-CE |
|---|---|
| 000 | TCI state18 |
| 001 | TCI state3 |
| 010 | TCI state5 |
| 011 | TCI state6 |
| 100 | Reserved |
| 101 | Reserved |
| 110 | Reserved |
| 111 | Reserved |

TABLE 9

| Value of code point in DCI | TCI state activated by MAC-CE |
|---|---|
| 000 | TCI state18 |
| 001 | TCI state3, TCI stated |
| 010 | TCI state5 |
| 011 | TCI state6, TCI state15 |
| 100 | Reserved |
| 101 | Reserved |
| 110 | Reserved |
| 111 | Reserved |

In an exemplary implementation, there is an association between the maximum number of the TCI states corresponding to the code point of the TCI indication domain in the DCI of the frequency-domain bandwidth and the number of the CORESET groups of the frequency-domain bandwidth. In a case where the maximum number of the TCI states corresponding to the code point of the TCI indication domain in the DCI of the frequency-domain bandwidth is greater than a first predetermined value, the number of the CORESET groups of the frequency-domain bandwidth is less than a second predetermined value. Alternatively, in a case where the number of the CORESET groups of the frequency-domain bandwidth is greater than or equal to the second predetermined value, the maximum number of the TCI states corresponding to the code point of the TCI indication domain in the DCI of the frequency-domain bandwidth is less than or equal to the first predetermined value. For example, the first predetermined value is 1, and the second predetermined value is 2.

In an exemplary implementation, there are three manners for configuring the TCI state list via RRC signaling.

Manner I: the RRC signaling configures one or more TCI state lists for each BWP.

Manner II: the RRC signaling configures one or more TCI state lists for each CC, and all of the BWP in the CC share the one or more TCI state lists.

Manner III: the RRC signaling configures one or more TCI state lists for a CC group, and all of the BWP of all of the CC in the CC group share the one or more TCI state lists.

Multiple TCI state lists corresponding to the above frequency-domain bandwidth correspond to different CORESET groups.

Which RRC configuration manner is specifically used can be notified by the RRC signaling, or a configuration method of the TCI state list is determined according to whether the updating or activating of the TCI state mapping table is shared.

In an exemplary implementation, one TCI state list for PDCCH is configured for one CORESET set instead of for each CORESET set. The TCI state list for PDCCH includes one or more TCI states. Further, one or more TCI states are selected for each CORESET in the CORESET group in the TCI state list for PDCCH by means of multiple MAC-CE commands as the activated TCI states of the CORESET. The CORESET set may also share the MAC-CE signaling. The MAC-CE signaling selects one or more TCI states for the CORESET set in the TCI state list for PDCCH as the activated TCI states of the CORESET.

The CORESET set is acquired by the following manners. Control signaling transmitted by a base station is received, and the control signaling includes the division of the CORESET set. The CORESET in the frequency-domain bandwidth is divided into multiple CORESET sets. The CORESET in the multiple frequency-domain bandwidths is divided into the multiple CORESET sets. The CORESET in the same CORESET set corresponds to a same set identifier.

The CORESET in the CORESET set includes the CORESET in one frequency-domain bandwidth or the multiple frequency-domain bandwidths.

In an exemplary implementation, multiple uplink frequency-domain bandwidths share a Sounding Reference Signal (SRS) set. That is to say, a spatial transmitting filter of target channels and/or signals in the multiple uplink frequency-domain bandwidths is acquired according to an SRS resource in the SRS set.

The SRS set may be a code book SRS set, or a non-codebook SRS set.

In an exemplary implementation, more than one TCI states are activated for the CORESET at the same time. The more than one TCI states meet at least one of the following characteristics: different TCI states in the more than one TCI states correspond to different frequency-domain resources of the CORESET; the different TCI states in the more than one TCI states correspond to different time-domain resources of the CORESET; or the different TCI states in the more than one TCI states correspond to different demodulation reference signal ports of the CORESET.

The activating of the more than one TCI states for the CORESET includes activating by means of MAC-CE, or direct activating by means of RRC.

Similarly, in NR Rel-15, for the target channels and/or the signals, spatial relationship information is configured for each target channel and/or signal in each BWP of each CC. The spatial relationship information includes a downlink reference signal or an uplink reference signal. In a case where the uplink reference signal is configured, it indicates that a spatial transmitting filter of the uplink target channel and/or signal is the same as a spatial transmitting filter of the uplink reference signal included in the spatial relationship information. In a case where the downlink reference signal is configured, it indicates that the spatial transmitting filter of the downlink target channel and/or signal is the same as a spatial transmitting filter of the downlink reference signal included in the spatial relationship information. How to reduce signaling overhead and signaling delay of spatial filter information of the uplink target channel and/or signal is also a problem to be resolved here.

In an exemplary implementation, FIG. 9 is a schematic flowchart of an information acquisition method provided in some embodiments of the present disclosure. The method is applicable to acquiring a situation of a transmission beam corresponding to a target channel and/or signal. The method may be performed by an information acquisition apparatus provided in some embodiments of the present disclosure. The information acquisition apparatus may be implemented by software and/or hardware, and integrated on user equipment or a base station.

As shown in FIG. 9, the information acquisition method according to some embodiments of the present disclosure mainly includes operation S910.

At S910, a target parameter is acquired according to a downlink information element and second information. The second information includes at least one of: timing advance information, a predetermined parameter, a number of repeated transmissions of an uplink target information element, a time-domain behavior parameter of the uplink target information element, a predetermined CC group, and a correspondence relationship between the downlink information element and an uplink target information element. The target parameter is spatial transmitting filter information of an uplink target information element.

In an exemplary implementation, in a case where the second information includes the correspondence relationship between the downlink information element and the uplink target information element, acquiring the target parameter according to the downlink information element and the second information includes at least one of the following operations. After a QCL-RS of the downlink information element is updated, the target parameter is updated. After a QCL-RS, associated with the receiving filter, of the downlink information element is updated, the target parameter is updated. Between two updates of the correspondence relationship between the downlink information element and the uplink target information element, the target parameter is acquired according to the same downlink information element. The correspondence relationship between the downlink information element and the uplink target information element is determined according to at least one of signaling information and a predetermined rule.

In an exemplary implementation, in a case where the second information includes the number of repeated transmissions of the uplink target information element and the number A of repeated transmissions of the uplink information element is greater than a preset threshold, acquiring the target parameter according to the downlink information element and the second information includes at least one of the following operations. The target parameter corresponding to each repeated transmission of the A repeated transmissions is acquired based on the same downlink information element. The target parameter corresponding to each repeated transmission of the A repeated transmissions is acquired based on the downlink information element corresponding to each repeated transmission. In a case where A repeated transmissions include B repeated transmission groups, and uplink target information elements are in a same repeated transmission group, the target parameter corresponding to each repeated transmission is acquired based on the same downlink information element. In a case where A repeated transmissions include B repeated transmission groups, and uplink target information elements are in different repeated transmission groups, the target parameter corresponding to each repeated transmission is acquired based on the downlink information elements corresponding to the repeated transmission groups, respectively.

B is a positive integer less than or equal to A.

In an exemplary implementation, the repeated transmission groups meet one of the following conditions. Each repeated transmission group includes one or more consecutive repeated transmissions. Each repeated transmission group includes one or more non-consecutive repeated transmissions. A minimum interval between the repeated transmissions included in each repeated transmission group is X repeated transmissions, wherein X is a positive integer greater than or equal to 1.

In an exemplary implementation, in a case where the second information includes the time-domain behavior parameter of the uplink target information element, acquiring the target parameter according to the downlink information element and the second information includes at least one of the following operations. In a period group of the uplink target information element, the target parameter is acquired based on the same downlink information element, and the period group includes periods of one or more uplink target information elements. In different period groups of the uplink target information elements, the target parameter is acquired based on the downlink information elements corresponding to the respective period groups, and the period group includes the periods of one or more uplink target information elements. In a case where the uplink target information element is a period uplink information element, the target parameter is acquired in a first manner. In a case where the uplink target information element is a semi-persistent uplink information element, the target parameter is acquired in a second manner. In a case where uplink target information element is an uplink information element scheduled by dynamic signaling, the target parameter is acquired in a third manner.

The first manner, the second manner, and the third manner are different from each other.

In an exemplary implementation, the time-domain behavior parameter of the uplink target information element includes at least one of: a period of the uplink target information element, a period offset of the uplink target information element, or periodic, semi-persistent, or aperiodic characteristics of the uplink target information element.

In an exemplary implementation, acquiring the target parameter in the first manner includes the following operation. The target parameter is acquired according to the downlink information element in a second time unit. The second time unit is acquired according to a time unit in which the uplink target information element is located.

In an exemplary implementation, acquiring the target parameter in the second manner includes the following operation. The target parameter is acquired according to a physical layer dynamic control channel for scheduling a predetermining channel. The predetermining channel includes a triggering signaling of the semi-persistent information element.

In an exemplary implementation, acquiring the target parameter in the third manner includes the following operation. The target parameter is acquired according to a physical layer dynamic control channel for scheduling the aperiodic uplink information element.

In an exemplary implementation, in a case where the uplink target channel includes a PUCCH, acquiring the target parameter according to the downlink information element and the second information includes the following operation. The target parameter is acquired according to the last PDCCH in D PDCCHs. An acquisition parameter for an index of the PDCCH includes a second predetermined CC group. Each PDCCH in the D PDCCHs corresponds to a set of HARQ-ACK information. The PUCCH includes D sets of HARQ-ACK information corresponding to the D PDCCHs.

In an exemplary implementation, the method includes at least one of the following operations. The number of the CCs included in the second predetermined CC group is less than or equal to the number of the CCs configured in a Master Cell Group (MCG) or a Secondary Cell Group (SCG). The number of the CCs included in the second predetermined CC group is less than or equal to the number of the CCs included in the CC set composed of the CCs in which the D PDCCHs are located. The second predetermined CC group only includes the downlink CC corresponding to the CC wherein the PUCCH is located. The resource indication information of the PUCCH is acquired by the first PDCCH in the D PDCCHs, and the spatial transmitting filter information of the PUCCH is acquired according to the last PDCCH in the D PDCCHs. In the same PDCCH occasion, indexes of the PDCCHs decrease progressively according to CC indexes in the second predetermined CC group, and the PDCCHs are sorted according to an ascending order of the PDCCH occasion.

An acquisition norm of the first PDCCH is different from an acquisition norm of the last PDCCH.

In an exemplary implementation, the downlink information element is in the second time unit. An acquisition parameter of the second time unit includes the second information.

The downlink information element includes at least one of: a control channel resource having a predetermined characteristic in a second time unit, and a downlink information element in a first preset CC group in the second time unit.

In an exemplary implementation, the second time unit includes at least one of: a time unit included in the time unit of the control channel resource and closest to the uplink target information element, wherein an uplink frame has a TA relative to a downlink frame, and the downlink channel includes the control channel resource; a time unit acquired based on the predetermined parameter of the downlink information element; a time unit acquired based on the predetermined parameter of the uplink target information element; a time unit acquired based on a predetermined parameter of a control channel resource for scheduling the uplink target information element; a time unit closest to the uplink target information element in a time unit including a control channel resource before the predetermined time for transmitting the uplink target information element, wherein an uplink frame has a TA relative to a downlink frame; and a minimum time interval between an end position of the second time unit and time for transmitting the uplink target information element is greater than or equal to a predetermined time interval, wherein the predetermined time interval is acquired according to a minimum time interval between an end position of the PDCCH for scheduling the uplink channel and/or signal and the uplink channel and/or signal.

In an exemplary implementation, the control channel resource having the predetermined characteristic meets at least one of the following conditions. There is a correspondence relationship between a CC in which the control channel resource is located and a CC in which the uplink target information element is located. A CC in which the control channel resource is located and a CC in which the uplink target information element is located are included in a same serving cell. A CC in which the control channel resource is located belongs to the first preset CC group. A control channel resource identifier of the control channel resource is the minimum or maximum among control channel resources included in the second time unit. In the second time unit, most time-domain symbols are occupied by a monitoring occasion of the control channel resource among control channel resources included in the second time unit. A period of a monitoring occasion of the control channel resource is the shortest among control channel resources included in the second time unit. In the second time unit, the control channel resource is associated with at least one search space to be detected. The control channel resource belongs to one control channel resource group, wherein there is a correspondence relationship between the control channel resource group and the target uplink information element.

In an exemplary implementation, acquiring the target parameter according to the downlink information element and the second information includes one of the following operations. The target parameter is acquired according to a receiving filter of the downlink information element. The target parameter is acquired according to a QCL-RS, associated with a spatial receiving parameter, of the downlink information element. The target parameter is acquired according to a demodulation reference signal of the downlink information element.

In an exemplary implementation, the predetermined parameter includes at least one of a sub-carrier spacing, a Cyclic Prefix (CP) length, a time-domain symbol length, and a slot length.

In an exemplary implementation, the predetermined parameter includes at least one of: a predetermined parameter of the downlink information element, a predetermined parameter of the uplink target information element, a predetermined parameter with a maximum sub-carrier spacing among the predetermined parameter of the downlink information element and the predetermined parameter of the uplink target information element, or a predetermined parameter with a minimum sub-carrier spacing among the predetermined parameter of the downlink information element and the predetermined parameter of the uplink target information element.

In an exemplary implementation, the spatial transmitting filter of the uplink target channel and/or signal is acquired according to the receiving filter of the downlink channel and/or signal, and/or the spatial transmitting filter of the uplink target channel and/or signal is acquired according to a predetermined QCL-RS associated with the downlink channel and/or signal.

For example, the spatial filter of the uplink target channel and/or signal is acquired according to a receiving filter of a CORESET having a predetermined characteristic in a slot closest to the uplink target channel and/or signal. For example, the spatial filter is acquired according to a QCL-RS of a CORESET having a predetermined characteristic associated with a spatial receiving parameter.

FIG. 10 is a schematic diagram showing a case where an uplink slot n has a TA relative to a downlink slot n provided in some embodiments of the present disclosure. As shown in FIG. 10, in a case where the spatial transmitting filter of the uplink target channel and/or signal is acquired according to the closest CORESET, the situation that the uplink slot n has a TA relative to the downlink slot n needs to be considered. On a terminal side, a start of the downlink slot n is not aligned with a start of the uplink slot n. In the case of a same slot index, the start of the uplink slot n has a TA compared to (relative to) the start of the downlink slot n.

FIG. 11 is a schematic diagram showing a case where an uplink frame i has a TA relative to a downlink frame i provided in some embodiments of the present disclosure. As shown in FIG. 11, in a case where the spatial transmitting filter of the uplink target channel and/or signal is acquired according to the closest CORESET, the situation that the uplink frame i has a TA relative to the downlink frame i needs to be considered. The uplink frame i has a TA relative to the downlink frame i (in a case where TA is a negative value, the uplink frame i has a retreat of TA relative to the downlink frame i). Especially in a case where the TA is relatively large, the downlink slot closest to uplink slot n before the uplink target channel and/or signal is transmitted may not be the slot n.

Therefore, it may be further set as a standard that under the premise of considering the TA, there is a CORESET having the predetermined characteristic in the closest second time unit before the uplink target channel and/or signal. Alternatively, before a predetermined moment, there is a CORESET having the predetermined characteristic in the second time unit closest to the uplink target channel and/or signal.

The CORESET having the predetermined characteristic is acquired according to at least one of the following information: time-domain symbols in which the uplink target channel and/or signal is located, a time unit index of the uplink target channel and/or signal, and a parameter set of the uplink target channel and/or signal. For example, the predetermined moment is a moment obtained by subtracting TA from the moment at which the uplink target channel and/or signal is transmitted. Further, since the parameter set of the uplink target channel and/or signal may be different from the parameter set of the CORESET having the predetermined characteristic, alignment is required. For example, a predetermined moment needs to be acquired according to numerologies (information such as the sub-carrier spacing) of the uplink target channel and/or signal and the CORESET. The unit of the predetermined moment is a first time unit. The first time unit may be one of frame, subframe, slot, or time-domain symbol. For example, in a case where the unit of the first time unit is slot, the CORESET having the predetermined characteristic is a CORESET having the predetermined characteristic in the time unit closest to the uplink target channel and/or signal before a predetermined slot. In a case where the first time unit is time-domain symbol, the CORESET having the predetermined characteristic is a CORESET having the predetermined characteristic in the time unit closest to the uplink target channel and/or signal before a predetermined time-domain symbol. For example, in a case where the first time unit is slot, the predetermined moment is a downlink slot with an index of $$\left\lfloor n_{PUCCH} \frac{2^{\mu_{PDCCH}}}{2^{\mu_{PUCCH}}} - TA \frac{N_{slot}^{subframe,\mu_{PDCCH}}}{10^{-3}} \right\rfloor,$$

or the predetermined moment is a downlink slot with an index of $$\left\lfloor n_{PUCCH} \frac{2^{\mu_{PDCCH}}}{2^{\mu_{PUCCH}}} - TA_{max} \frac{N_{slot}^{subframe,\mu_{PDCCH}}}{10^{-3}} \right\rfloor.$$

Alternatively, the moment is a downlink time-domain symbol with a time-domain symbol index in a downlink slot with an index of $$\left\lfloor \frac{(n_{PUCCH} * N_{ofdm,PUCCH}^{slot} + n_{PUCCH,ofdm}^{\mu_{PUCCH}} - TA_{max} \frac{N_{slot}^{subframe,\mu_{PUCCH}}}{10^{-3}}) \frac{2^{\mu_{PDCCH}} * N_{ofdm,PDCCH}^{slot}}{2^{\mu_{PUCCH}} * N_{ofdm,PUCCH}^{slot}}}{N_{ofdm,PDCCH}^{slot}} \right\rfloor.$$

Where $n_{PUCCH}$ is a slot index (the uplink slot index without considering the TA, that is, the uplink slot index in a case where the uplink frame and the downlink frame have aligned boundaries) where the uplink target channel and/or signal is located. The unit of TA is seconds. The sub-carrier spacing of the PUCCH is $2^{\mu_{PUCCH}}*15$ KHz. The sub-carrier spacing of the PDCCH is $2^{\mu_{PDCCH}}*15$ KHz. $N_{slot}^{subframe,\mu_{PDCCH}}$ is the number of slots included in one frame based on the sub-carrier spacing of the PDCCH. $N_{slot}^{subframe,\mu_{PUCCH}}$ the number of slots included in one frame based on the sub-carrier spacing of the PUCCH. $N_{ofdm,PDCCH}^{slot}$ is the number of OFDMs included in one slot of the PDCCH. $N_{ofdm,PUCCH}^{slot}$ is the number of OFDMs included in one slot of the PUCCH.

The second time unit may be one of slot, sub-slot, subframe, frame, one or more time-domain symbols, or one or more slots. The second time unit may be configured by means of signaling. Further, the second time unit is acquired based on one of the following sub-carrier spacings: the sub-carrier spacing of the uplink target channel and/or signal, the sub-carrier spacing of the CORESET, a minimum sub-carrier spacing among the sub-carrier spacing of the uplink target channel and/or signal and the sub-carrier spacing of the CORESET, or a maximum sub-carrier spacing among the sub-carrier spacing of the uplink target channel and/or signal and the sub-carrier spacing of the CORESET.

The CORESET having the predetermined characteristic is a CORESET in the second time unit meeting at least one of the following characteristics. There is a correspondence relationship between a serving cell in which the CORESET is located and a serving cell in which the uplink target channel and/or signal is located, for example, serving cell indexes are the same. Definitely, other correspondence relationships are also not excluded. Alternatively, the serving cell in which the CORESET is located is in the first preset CC group. Alternatively, the CORESET has a lowest CORESETID, or a highest CORESETID. Alternatively, the most time-domain symbols are occupied by the CORESET in the monitoring occasion in the second time unit, wherein the monitoring occasion of the CORESET represents a monitoring occasion of the search space for the CORESET. Alternatively, the monitoring occasion of the CORESET in the second time unit has the shortest period, wherein the monitoring occasion of the CORESET represents a monitoring occasion of the search space associated with the CORESET. Alternatively, the CORESET is associated with at least one search space required to be detected in the second time unit. Alternatively, the CORESET belongs to one CORESET group, and there is a correspondence relationship between the CORESET group and the target channel and/or signal.

FIG. 12 is a schematic diagram of determining a sub-carrier spacing of a second time unit in a case where one downlink slot corresponds to two uplink slots provided in some embodiments of the present disclosure. As shown in FIG. 12, the CORESET having the predetermined characteristic is the CORESET with the lowest CORESETID in the second time unit. In a case where a slot division boundary for the second time unit is acquired based on the sub-carrier spacing of the CORESET, transmission beams of the uplink target channel and/or signal in uplink slot 2n and uplink slot 2n+1 are acquired according to receiving beams of CORESET0 in downlink slot n−1. In a case where a slot division boundary for the second time unit is acquired based on the sub-carrier spacing of the uplink target channel and/or signal, the transmission beams of the uplink target channel and/or signal in the uplink slot 2n are acquired according to the receiving beams of the lowest CORESET, that is, the CORESET0, in the front half of the downlink slot n−1, and the transmission beams of the uplink target channel and/or signal in the uplink slot 2n+1 are acquired according to the receiving beams of the lowest CORESET, that is, CORESET1, in the rear half of the downlink slot n−1.

Figure 13:
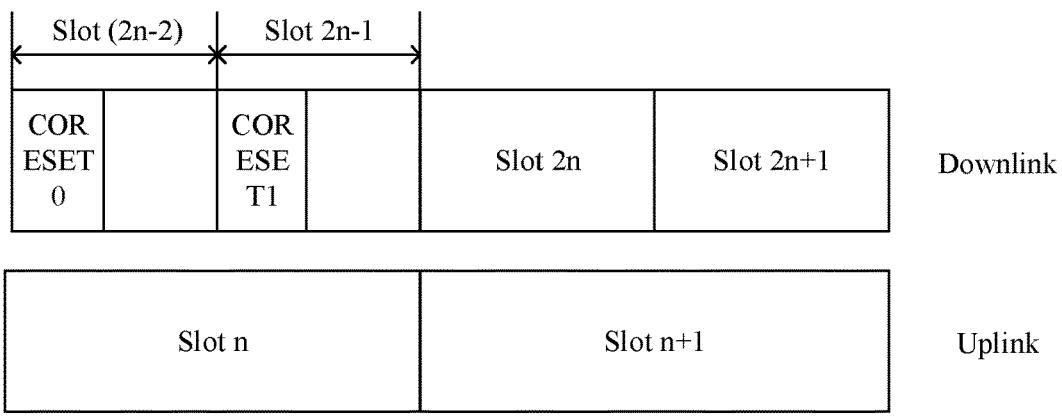
FIG. 13 is a schematic diagram of determining a subcarrier spacing of a second time unit in a case where two downlink slots correspond to one uplink slot provided in some embodiments of the present disclosure.

FIG. 13 is a schematic diagram of determining a sub-carrier spacing of a second time unit in a case where two downlink slots correspond to one uplink slot provided in some embodiments of the present disclosure. As shown in FIG. 13, two downlink slots correspond to one uplink slot. In a case where the second time unit is based on the sub-carrier spacing of the CORESET, the transmission beams of the uplink target channel and/or signal in slot n are acquired according to the receiving beam of the lowest CORESET in downlink {slot 2n−2 and slot 2n−1}. That is to say, the transmission beams of the uplink target channel and/or signal in the slot n are acquired according to the receiving beam of the CORESET0. In a case where second time unit is based on the sub-carrier spacing of the uplink target channel and/or signal, the transmission beams of the uplink target channel and/or signal of the front half of the slot n are acquired according to the receiving beam of the lowest CORESET (that is, CORESET0) in downlink {slot 2n−2}. The transmission beams of the uplink target channel and/or signal of the rear half of the slot n are acquired according to the receiving beam of the lowest CORESET (that is, CORESET1) in the downlink {slot 2n−1}.

In a case where the number of repeated transmissions of the PUCCH is greater than 1, that is, the aggregation is greater than 1. There are the following manners for determining the transmission beams of the PUCCH.

Manner I: for each repeated transmission in multiple repeated transmissions, the transmission beams of the target channel and/or signal of the repeated transmission are acquired according to the receiving beams of the CORESET having the predetermined characteristic in the second time unit closest to the uplink target channel and/or signal of the repeated transmission before the predetermined moment of a starting time-domain symbol of the repeated transmission. The CORESET on which different repeated transmissions in the multiple repeated transmissions are based may be different.

Manner II: the transmission beams of each repeated transmission in the multiple repeated transmissions are the same, which are the transmission beams of the uplink target channel and/or signal in all of the repeated transmissions acquired according to the receiving beams of the CORESET having the predetermined characteristic in the second time unit closest to a starting time-domain symbol of the PUCCH before the predetermined moment of the starting time-domain symbol of the PUCCH.

Manner III: the multiple repeated transmissions are divided into multiple repeated transmission groups. The transmission beams in each group are kept unchanged. Manner II is used. The transmission beams in different groups are changeable. In other words, Manner III is a combination of Manner I and Manner II.

The above methods acquire the transmission beams of the uplink target channel and/or signal according to the receiving beams of the CORESET. In the embodiments, the transmission beams of the uplink target channel and/or signal may alternatively be acquired according to receiving beams of PDSCH if there is the PDSCH in the second time unit.

The transmission beams of the uplink target channel and/or signal are acquired according to the time-domain parameters of the uplink target channel and/or signal. For example, the uplink target channel and/or signal is a periodic channel and/or signal or a semi-persistent channel and/or signal. The transmission beams of the uplink target channel and/or signal are acquired in the following manners.

Manner I: the transmission beams of the uplink target channel and/or signal in the period are acquired according to the receiving beams of the CORESET having the predetermined characteristic in the second time unit closest to the uplink target channel and/or signal before the predetermined moment of the starting time-domain symbol of the uplink target channel and/or signal in each period. The CORESET on which the transmission beams of the uplink target channel and/or signal in each period are based may be different, or even different repeated transmissions in one period are based on different CORESETs.

Manner II: the transmission beams of the uplink target channel and/or signal in all of the periods are acquired according to the receiving beams of the CORESET having the predetermined characteristic in the second time unit closest to the uplink target channel and/or signal before the predetermined moment of the starting time-domain symbol of the uplink target channel and/or signal in the first period.

Manner III: the multiple periods are divided into groups. Each period in each period group is based on the same CORESET, so that the transmission beams are the same. The periods in different period groups may be based on different CORESETs, so that the transmission beams may be different.

Manner IV: for the periodic or semi-persistent uplink target channel and/or signal, a correspondence relationship between the periodic or semi-persistent uplink target channel and/or signal and the CORESET is directly established by means of signaling information. The transmission beams of the periodic or semi-persistent uplink target channel and/or signal vary with the QCL-RS of the CORESET.

The operation of acquiring the transmission beams of the uplink target channel and/or signal according to the first preset CC group includes the following operations. The CORESET having the predetermined characteristic is the CORESET having the predetermined characteristic in the first preset CC group in the second time unit closest to the uplink target channel and/or signal before the predetermined moment of the uplink target channel and/or signal. In a case where there are multiple CORESETs having the predetermined characteristic, the CORESET having the predetermined characteristic in the CC with the lowest or highest CC index in the first preset CC group is taken. The above operation of acquiring the transmission beams of the uplink target channel and/or signal according to the receiving beams of the CORESET or the PDSCH may also include the following operation. The transmission beams of the uplink target channel and/or signal are acquired according to the QCL-RS of the CORESET or the PDSCH associated with the spatial receiving parameter, or the transmission beams of the uplink target channel and/or signal are acquired according to DMRS of the CORESET or the PDSCH.

For the above "before the predetermined moment of the uplink target channel and/or signal", the uplink target channel and/or signal is the uplink target channel and/or signal without considering the TA. In a case where the TA is considered, the above "before the predetermined moment of the uplink target channel and/or signal" may be replaced with "before a transmission moment of the uplink target channel and/or signal".

In an exemplary implementation, a method for acquiring the spatial filter of the PUCCH resource is configured in the PUCCH resource; or a method for acquiring the spatial filter of the PUCCH resource is configured in the PUCCH resource set, and all of the PUCCH resources in the PUCCH resource set share a same acquisition manner. The method for acquiring the spatial transmitting filter of the PUCCH resource includes at least two of the following manners.

Manner I: the spatial transmitting filter of the PUCCH is explicitly configured by signaling, for example, spatial relationship information of the PUCCH resource is explicitly configured by signaling. The spatial relationship information includes a downlink reference signal or an uplink reference signal. The spatial transmitting filter of the PUCCH is acquired according to the spatial transmitting filter of the uplink reference signal in the spatial relationship information, or the spatial transmitting filter of the PUCCH is acquired according to the spatial transmitting filter of the downlink reference signal in the spatial relationship information.

Manner II: the spatial transmitting filter is determined according to transmission beams of a closest transmitted Physical Random Access Channel (PRACH).

Manner III: the spatial transmitting filter is acquired according to the receiving beams of the CORESET having the predetermined characteristic in the second time unit.

Manner IV: according to receiving performance of multiple downlink reference signals, a terminal selects one of the downlink reference signals. The transmission beams of the PUCCH are determined according to the receiving beams of the selected downlink reference signal.

In an exemplary implementation, a correspondence relationship between the uplink target channel and/or signal and the CORESET is directly established by means of the signaling information. After the transmission beams of the CORESET are changed, for example, in a case where the TCI state of the CORESET is activated by the MAC-CE signaling, the transmission beams of the uplink target channel and/or signal having the correspondence with the CORESET also change with the transmission beams of the CORESET.

In an exemplary implementation, in a case where the transmission beams of the aperiodic PUCCH are acquired according to the receiving beams of the PDCCH for scheduling the PUCCH, in a case where the PUCCH includes HARQ-ACK information corresponding to multiple PDSCHs, a PUCCH resource in which the HARQ-ACK information is located is acquired according to the last DCI (that is, the DCI with a largest DCI index) in multiple DCIs corresponding to the multiple PDSCHs. The serial number of the multiple DCIs increases first with the serving cell index in the monitoring occasion of the PDCCH, and then with the index of the monitoring occasion. One PDCCH monitoring occasion includes PDCCH monitoring occasions having a same starting position in the multiple CCs. The indexes of the monitoring occasions of the PDCCH are numbered by incrementing from the starting positions of the PDCCH monitoring occasions.

Figure 14:
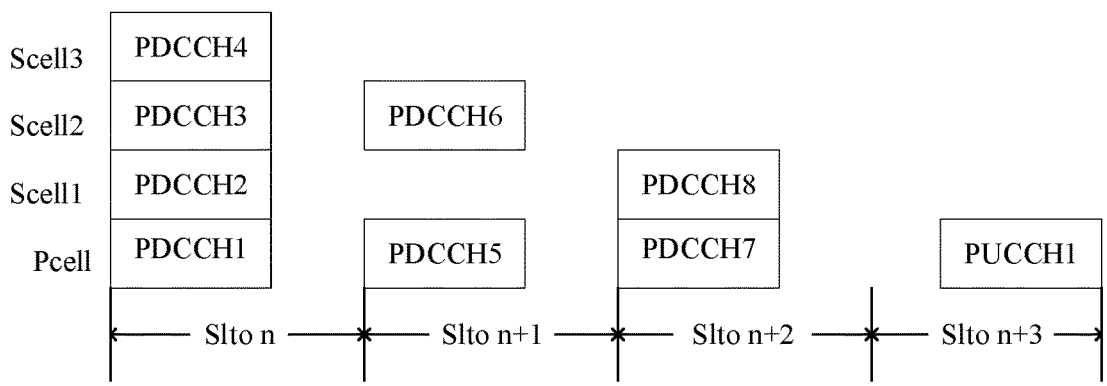
FIG. 14 is a schematic diagram of acquiring a Physical Uplink Control Channel (PUCCH) resource in which a Hybrid Automatic Repeat reQuest-ACK (HARQ-ACK) is located according to information indicated in the last PDCCH provided in some embodiments of the present disclosure.

FIG. 14 is a schematic diagram of acquiring a PUCCH resource in which an HARQ-ACK is located according to information indicated in the last PDCCH provided in some embodiments of the present disclosure. As shown in FIG. 14, the HARQ-ACKs of the PDSCHs scheduled by the PDCCH1 to the PDCCH8 are fed back in the PUCCH1 in slot(n+3) (that is, slot n+3 in the figure). Resource information of the PUCCH1 on the slot(n+3) is determined according to a PUCCH resource index in the PDCCH8. However, in a case where a serving cell index of a Pcell is specified as 0, transmission beams of the PUCCH in the Pcell are required to be determined according to the CORESETs in other serving cells. Especially in a case where the transmission beams in the CORESET in the Pcell have better robustness compared with the transmission beams in other serving cells, the robustness of the transmission beams of the PUCCH is not very good. Therefore, the resource information of the PUCCH may be acquired according to the PDCCH8. However, the transmission beams of the PUCCH are acquired according to the receiving beams of the last PDCCH in the second predetermined CC group. The number of the PDCCHs in the second predetermined CC group is incremented first with the serving cell in the same PDCCH monitoring occasion (in a case where the number of the CCs included in the second predetermined CC group is greater than 1) and then with the PDCCH monitoring occasion. For example, the second predetermined CC group includes {Pcell, Scell2}, then the transmission beams of the PUCCH1 are acquired according to the PDCCH7. Alternatively, the second predetermined CC group includes {Pcell}, the beams of the PUCCH may be acquired according to the PDCCH7, or the transmission beams of the PUCCH1 are acquired according to the last DCI. However, the serial numbers of the DCIs are first progressively decreased with the serving cell indexes in the monitoring occasion of the PDCCH, and then incremented with the indexes of the monitoring occasion.

The receiving beams of the CORESET in which the PDCCH is located are acquired according to the receiving beams of the PDCCH.

In an exemplary implementation, the uplink target channel and/or signal is associated with the multiple CORESETs. The terminal determines a QCL-RS set according to the QCL-RS associated with the spatial receiving parameter of each CORESET in the multiple CORESETs. The terminal determines the transmission beams of the uplink target channel and/or signal according to the QCL-RS.

In an exemplary implementation, in a case where a reporting setting is acquired based on a Non-Zero-Power-Channel State Information-Reference Signal (NZP-CSI-RS) resource set and multiple interference measurement resource NZP-CSI-RS resource sets, predetermined parameters of NZP-CSI-RS resources included in the multiple NZP-CSI-RS resource sets are the same. For example, the predetermined parameter includes one or more of the following parameters: a PRB starting position, the number of PRBs, or types of code division multiplexing (CDM-type).

In an exemplary implementation, according to the multiple TCI states of one CORESET, the spatial transmitting filter of the uplink target channel and/or signal is acquired. For example, the multiple TCI states of the CORESET respectively correspond to different time-domain resources, frequency-domain resources, and/or ports of the uplink target channel and/or signal.

Alternatively, the spatial transmitting filter of the uplink target channel and/or signal is acquired according to the multiple TCI states of multiple CORESETs. One CORESET corresponds to one TCI state. The multiple TCI states respectively correspond to different resources of the uplink target channel and/or signal. The resources include time-domain resources, frequency-domain resources, port resources, and/or repeat times.

The different resources of the uplink target channel and/or signal acquire the spatial transmitting filter of the uplink target channel and/or signal according to the QCL-RS, associated with the spatial receiving parameter, in the TCI states corresponding to the resources. For example, the spatial transmitting filter of the uplink target channel and/or signal is acquired according to a spatial transmitting filter receiving the QCL-RS.

The TCI state of the CORESET is a TCI state activated in the CORESET.

In an exemplary implementation, a correspondence relationship between the uplink target information element and the downlink information element is directly established according to signaling information and/or a predetermined rule. After the TCI of the downlink information element is updated, the spatial transmitting filter of the uplink target information element is changed subsequently. The uplink target information element always follows the current downlink information element to determine the spatial transmitting filter of the target information element, unless the correspondence is updated. For example, the correspondence is established via the RRC signaling, or it may be specified that in a case where the resource index of the uplink target information element and the resource index of the downlink information element meet a predetermined condition, there is the correspondence relationship between the uplink target information element and the downlink information element.

The information element includes channels and/or signals.

The DCI may dynamically trigger many aperiodic measurement reference signal resources. Currently, the slot offset (referred to as slotoffset hereinafter) of the aperiodic measurement reference signals is configured based on a high-level signaling. Slotoffset is a slot interval between a slot in which the PDCCH for scheduling the aperiodic measurement reference signal is located and a slot in which the aperiodic measurement reference signal is located. For example, in a case where the sub-carrier spacings occupied by the PDCCH and the aperiodic measurement reference signals are the same, the slot in which the PDCCH is located is slot n, and the slot where the aperiodic measurement reference signal is located is n+slotoffset. In a case where the sub-carrier spacings occupied by the PDCCH and the aperiodic measurement reference signals are different, it may be required to calculate the slot in which the aperiodic measurement reference signals are located based on the sub-carrier spacings.

However, great limitation may be brought for system scheduling, and the aperiodic measurement reference signals cannot be flexibly and dynamically scheduled on demand. For this reason, the following scheme is adopted.

Figure 15:
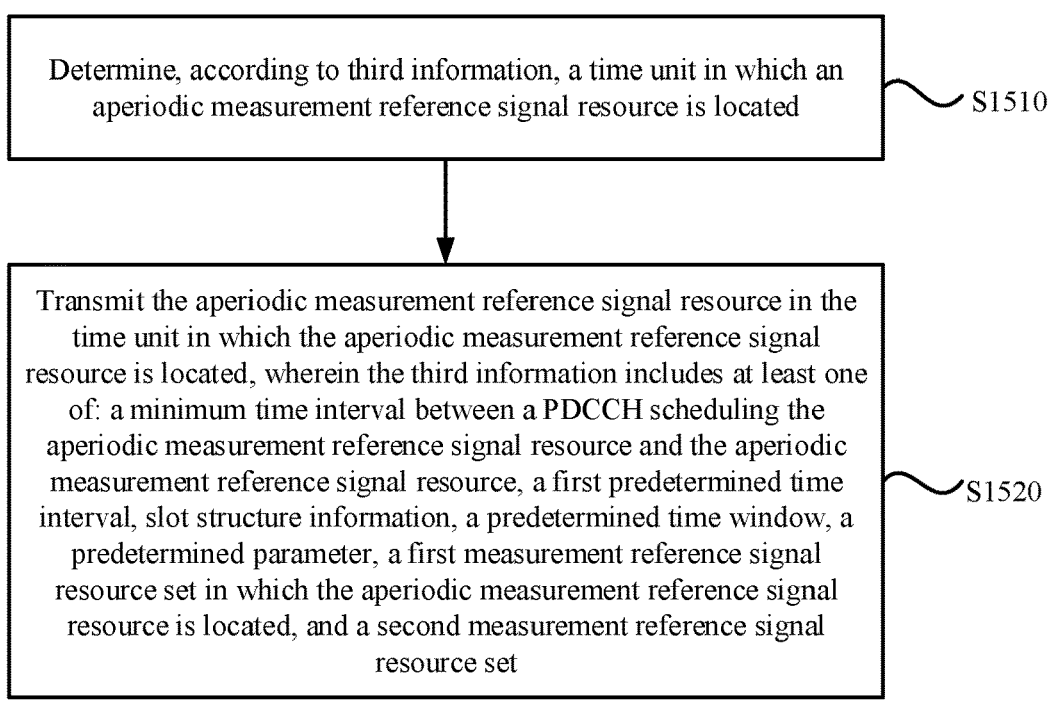
FIG. 15 is a schematic flowchart of an information transmission method provided in some embodiments of the present disclosure.

In an exemplary implementation, FIG. 15 is a schematic flowchart of an information transmission method provided in some embodiments of the present disclosure. The method is applicable to determining the QCL-RS corresponding to the target channel and/or signal. The method may be performed by an information determination apparatus provided in some embodiments of the present disclosure. The information determination apparatus may be implemented by software and/or hardware, and integrated on user equipment or a base station.

As shown in FIG. 15, the information transmission method provided in some embodiments of the present disclosure mainly includes the following operations.

At S1510, a time unit in which an aperiodic measurement reference signal resource is located is determined according to third information.

At S1520, the aperiodic measurement reference signal resource is transmitted in the time unit in which the aperiodic measurement reference signal resource is located.

The third information includes at least one of: a minimum time interval between a PDCCH scheduling the aperiodic measurement reference signal resource and the aperiodic measurement reference signal resource, a first predetermined time interval, slot structure information, a predetermined time window, a predetermined parameter, a first measurement reference signal resource set in which the aperiodic measurement reference signal resource is located, and a second measurement reference signal resource set.

In an exemplary implementation, the minimum time interval between the PDCCH scheduling the aperiodic measurement reference signal resource and the aperiodic measurement reference signal resource is acquired according to at least one of the following: a transmission direction of the aperiodic measurement reference signal resource, wherein the transmission direction includes uplink transmission and downlink transmission, for example, a minimum time interval (for example, the minimum time interval being 0 time-domain symbol) corresponding to an aperiodic downlink reference signal is less than a minimum time interval (for example, the minimum time interval is a minimum time interval between the PDCCH for scheduling the aperiodic uplink measurement reference resource and the aperiodic uplink measurement reference resource, that is, the minimum time interval includes minimum processing time for the terminal to receive the PDCCH and prepare to send the uplink aperiodic measurement reference signal) corresponding to an aperiodic uplink reference signal; a relationship between a carrier in which the PDCCH is located and a carrier in which the aperiodic measurement reference signal resource is located, for example, the minimum time interval in a case where the PDCCH and the aperiodic measurement reference signal resource are on different carriers being greater than the minimum time interval in a case where the PDCCH and the aperiodic measurement reference signal resource are on the same carrier; a relationship between the predetermined parameter information of the PDCCH and the predetermined parameter information of the aperiodic measurement reference signal resource, for example, the minimum time interval in a case where the sub-carrier spacings of the PDCCH and the aperiodic measurement reference signal resource are different being greater than the minimum time interval in a case where the sub-carrier spacings of the PDCCH and the aperiodic measurement reference signal resource are the same; the predetermined parameter information of the PDCCH, for example, the predetermined parameter including the sub-carrier spacing; and the predetermined parameter information of the aperiodic measurement reference signal resource, for example, the predetermined parameter including the sub-carrier spacing.

In an exemplary implementation, a determining manner for the minimum time interval includes at least one of the following manners. In a case where the aperiodic measurement reference signal resource is an uplink aperiodic measurement reference signal resource, the minimum time interval is determined according to capability information reported by a communication node, wherein the communication node includes a communication node transmitting the uplink aperiodic measurement reference signal resource. In a case where the PDCCH and the aperiodic measurement reference signal resource are on the same carrier, a first time interval is determined as the minimum time interval. In a case where the PDCCH and the aperiodic measurement reference signal resource are on different carriers, a second time interval is determined as the minimum time interval. In a case where the predetermined parameter of the PDCCH is the same as the predetermined parameter of the aperiodic measurement reference signal resource, a third time interval is determined as the minimum time interval. In a case where the predetermined parameter of the PDCCH is different from the predetermined parameter of the aperiodic measurement reference signal resource, a fourth time interval is determined as the minimum time interval. The predetermined parameter includes a sub-carrier spacing. The first time interval is less than the second time interval, and/or the third time interval is less than the fourth time interval.

In an exemplary implementation, the operation of determining, according to the third information, the time unit in which the aperiodic measurement reference signal resource is located includes the following operations. In a case where a predetermined condition is met, the time unit in which the aperiodic measurement reference signal resource is located is determined according to the third information. The predetermined condition includes one of the following conditions: there is no time unit interval configured in the first measurement reference signal resource set; there is no time unit interval configured in the first measurement reference signal resource set, and at least one QCL-RS associated with the spatial receiving parameter is configured or activated in a frequency-domain bandwidth in which the aperiodic measurement reference signal resource is located, for example, in a TCI state list configured by RRC in a BWP in which the aperiodic measurement reference signal resource is located, or in a TCI state set activated by MAC-CE in a BWP in which the aperiodic measurement reference signal resource is located, there is at least one TCI state in which a QCL-RS associated with the spatial receiving parameter is configured or activated, that is, a QCL-RS associated with QCL-Type D is configured or activated; there is no time unit interval configured in the first measurement reference signal resource set, and the carrier in which the aperiodic measurement reference signal resource is located belongs to FR2, wherein the FR2 includes a carrier having a center position greater than a predetermined threshold; the time unit determined according to the time unit interval configured in the first measurement reference signal resource set is not an available time unit; and the time unit interval in the first measurement reference signal resource set is a predetermined value, for example, the configured interval is a predetermined value, or the time interval acquired according to a predetermined rule is a predetermined value, wherein the predetermined value is 0 or other values.

In an exemplary implementation, the operation of determining, according to the third information, the time unit in which the aperiodic measurement reference signal resource is located includes at least one of the following operations. After the minimum time interval after the PDCCH, the first available time unit is the time unit in which the aperiodic measurement reference signal resource is located. After the first predetermined time interval after the PDCCH, the first available time unit is the time unit in which the aperiodic measurement reference signal resource is located, wherein the first available time unit is acquired according to the third information. Within a predetermined time window range after the PDCCH, in a case where the available time unit is not found for any of the first measurement reference signal resource set and the second measurement reference signal resource set, the measurement reference resource is not received, for example, in a case where the available time unit is not found for any of a channel resource set and an interference measurement resource set associated with the same CSI reporting setting, it means that the available time unit is not found in either the first measurement reference signal resource set or the second measurement reference signal resource set, then, the reception of the first measurement reference signal resource set and the second measurement reference signal resource set is abandoned, especially when the first measurement reference signal resource set and the second measurement reference signal resource set both are aperiodic measurement reference signal sets. The interference measurement resource set is NZP CSI-RS set.

The available time unit meets at least one of the following conditions. The available time unit is in the predetermined time window after the PDCCH, that is, in a case where there is no available time unit found in the predetermined time window, the transmission of the aperiodic measurement reference signal resource is abandoned. On each time-domain symbol in a first time-domain symbol set in the available time unit, a transmission direction on the time-domain symbol does not conflict with a transmission direction of the aperiodic measurement reference signal resource, wherein the transmission direction on the time-domain symbol is determined according to the slot structure information. For example, in a case where all of the aperiodic measurement reference signal resources in the first measurement reference set can be transmitted and do not conflict with each other, it is considered that this is an available time unit, or in a case where all of the measurement reference signal resources in the first measurement reference set can be transmitted and do not conflict with each other, it is considered that this is an available time unit. On each time-domain symbol in a first time-domain symbol set in the available time unit, each aperiodic measurement reference signal resource in the first measurement reference signal resource set on the time-domain symbol in the available time unit does not conflict with a QCL-RS, associated with a spatial receiving parameter, of a second downlink channel and/or signal on the time-domain symbol, wherein the aperiodic measurement reference signal is a downlink aperiodic measurement signal. For example, in a case where all of the aperiodic measurement reference signal resources in the first measurement reference set does not conflict with the receiving beams of the second downlink channel and/or signal, it is considered that this is an available time unit, or in a case where all of the measurement reference signal resources in the first measurement reference set can be transmitted and do not conflict with each other, it is considered that this is an available time unit. For example, the second downlink channel and/or signal includes at least one of: a downlink channel and/or signal for which scheduling time delay is greater than a predetermined value, a search space, a periodic downlink measurement reference signal, a semi-persistent downlink measurement reference signal, and a second downlink channel and/or signal satisfying a condition that an end position of the PDCCH for scheduling the second downlink channel and/or signal is earlier than an end position of the PDCCH for scheduling the aperiodic measurement reference resource. On each time-domain symbol in a first time-domain symbol set in the available time unit, each aperiodic measurement reference signal resource in the first measurement reference signal resource set on the time-domain symbol and a spatial transmitting filter of a second uplink channel and/or signal on the time-domain symbol are able to be transmitted simultaneously by a communication node, wherein the communication node is a communication node transmitting the aperiodic measurement reference signal, and the aperiodic measurement reference signal is an uplink aperiodic measurement signal. For example, the second uplink channel and/or signal includes at least one of: an uplink channel and/or signal for which scheduling time delay is greater than the predetermined value, a second uplink channel and/or signal satisfying a condition that an end position of the PDCCH for scheduling the second uplink channel and/or signal is earlier than an end position of the PDCCH for scheduling the aperiodic measurement reference resource, a search space, a periodic uplink measurement reference signal, a semi-persistent uplink measurement reference signal, a PUSCH with a configured grant (namely, a scheduling-free PUSCH), a periodic PUCCH, and a semi-persistent PUCCH. In the PDCCH and the first available time unit, the slot structure information is not changed. Within the predetermined time window after the PDCCH, the slot structure information is not changed. Between the PDCCH and the first available time unit, the same slot structure information is adopted. Within the predetermined time window after the PDCCH, the same slot structure information is adopted. For example, between the PDCCH and the first available time unit, the slot structure information cannot be changed, otherwise the behavior of the terminal would be very troublesome when determining the above conflict problem. The time interval between the latest PDCCH including the slot structure information before the available time unit and a starting symbol of the aperiodic measurement reference signal resource in the available time unit is greater than or equal to the first predetermined time interval.

The first time-domain symbol set includes one of the following time-domain symbol sets within one time unit: a set of time-domain symbols including all time-domain symbols occupied by the aperiodic measurement reference signal resource; a set of time-domain symbols including all time-domain symbols occupied by all measurement reference signal resources in the first measurement reference signal resource set; a set of time-domain symbols including all time-domain symbols occupied by all measurement reference signal resources in the first measurement reference signal resource set and the second measurement reference signal resource set.

In an exemplary implementation, the slot structure information is acquired according to at least the following contents: a time-domain symbol position in which a synchronization signal is located; a semi-static frame structure; DCI format 2_0; and a time-domain symbol in which a PRACH is located.

For the slot structure information received before the PDCCH, and the closest and available slot structure information received before the PDCCH, for example, in order to determine whether the time unit is available, it is necessary to acquire the transmission direction of each time-domain symbol in the time unit according to the slot structure information. However, slot structure information notified by notification signaling may be the above information. The terminal needs to determine that even if the slot structure information is updated later, the closest and available slot structure information received before the PDCCH is used when the available time unit is determined.

The slot structure information in each time unit after the PDCCH includes available slot structure information in each time unit. That is to say, in a case where there is a slot structure information update signaling after the PDCCH, the transmission direction of each time-domain symbol in the time unit is determined according to the closest slot information in the time unit.

Because the above information can determine a transmission direction of the time-domain symbol, and the available level of the slot structure information is higher than the transmission direction determined by the aperiodic measurement reference signal resource, for example, for the time-domain symbol 13 of the slot occupied by the aperiodic uplink measurement reference signal resource, when searching for an available time unit, in a case where the transmission direction of the time-domain symbol 13 is determined to be uplink according to the aperiodic uplink measurement reference signal resource, but the transmission direction in the slot is determined to be downlink according to the slot structure information, the slot is not an available slot.

In an exemplary implementation, the time unit includes one of a slot, a subframe, or a sub-slot. One sub-slot includes one or more consecutive time-domain symbols in one slot. For example, when searching for an available time unit, searching is performed by using the time unit as a unit. The number of the time-domain symbols included in the sub-slot is greater than or equal to the number of the time-domain symbols included within the largest interval in the time-domain symbols occupied by all measurement reference signal resources in the first measurement reference signal resource set.

In an exemplary implementation, the first predetermined time interval includes: a minimum time interval between the PDCCH and the aperiodic measurement reference signal required to apply a first predetermined parameter to transmission of the aperiodic measurement reference signal. The first predetermined parameter includes one of: spatial transmitting filter information, a QCL-RS, or a QCL-RS associated with a spatial receiving parameter. The first predetermined parameter is indicated by a control channel for scheduling the aperiodic measurement reference signal. The predetermined parameter includes the first predetermined parameter. For example, in a case where the time interval between the PDCCH for scheduling aperiodic CSI-RS and the aperiodic CSI-RS is less than the first predetermined time interval, the TCI indicated in the PDCCH cannot be used to acquire the TCI of the aperiodic CSI-RS, because the terminal has not decoded the PDCCH yet, or has not enough time to switch to the TCI indicated in the PDCCH. Only when the time interval between the PDCCH for scheduling the aperiodic CSI-RS and the aperiodic CSI-RS is greater than or equal to a time range of the first predetermined time interval, can the TCI of the aperiodic CSI-RS indicated in the PDCCH be used to receive the aperiodic CSI-RS. Alternatively, the first predetermined time interval includes: a second predetermined parameter indicated by the control channel for scheduling the aperiodic measurement reference signal is applied to transmission of the aperiodic reference signal, wherein a time interval between the latest PDCCH including the slot structure information before the available time unit and a starting symbol of the aperiodic measurement reference signal resource in the available time unit is greater than or equal to the first predetermined time interval. For example, there is Slot Format Indicator (SFI) indicated in DCI format 2_0 between the PDCCH for scheduling the aperiodic CSI-RS and the available time unit, it takes some processing time for the terminal to receive the DCI2_0, learn that this is the available time unit, and receive the aperiodic CSI-RS by using the TCI in the PDCCH for scheduling the aperiodic CSI-RS. The processing time requires at least the first predetermined time interval, in other words, the processing time is equal to the first predetermined time interval at the minimum. Herein, the time interval may also be referred to as a time duration.

In an exemplary implementation, the predetermined parameter includes a second predetermined parameter. The second predetermined parameter includes at least a sub-carrier spacing, for example, for different sub-carrier spacings, the minimum time interval is different.

In an exemplary implementation, the second measurement reference signal resource set meets at least one of the following characteristics. As a first characteristic, the first measurement reference signal resource set and the second measurement reference signal resource set are associated with a same measurement reporting setting. As a second characteristic, one of the first measurement reference signal resource set and the second measurement reference signal resource set is a channel measurement reference signal resource set, and the other is an interference measurement reference signal resource set. For example, in a case where the available time unit is not found for any of a channel resource set and an interference measurement resource set associated with the same CSI reporting setting, it means that the available time unit is not found in either the first measurement reference signal resource set or the second measurement reference signal resource set, then, the reception of the first measurement reference signal resource set and the second measurement reference signal resource set is abandoned, especially when the first measurement reference signal resource set and the second measurement reference signal resource set both are aperiodic measurement reference signal sets. The interference measurement resource set is NZP CSI-RS set. As a third characteristic, the first measurement reference signal resource set corresponds to an antenna port group 1, and the second measurement reference signal resource set corresponds to an antenna port group 2, wherein a difference set of the antenna port group 1 and the antenna port group 2 is not null, and/or an intersection of the antenna port group 1 and the antenna port group 2 is null. For example, the first measurement reference signal resource set and the second measurement reference signal resource set are two SRS sets for switching uplink antennas, that is to say, an available time unit is found, in the predetermined time window, for the resources in each SRS set in the two sets configured as antenna switching, otherwise, the two SRS sets are discarded, that is, if no available time unit is found, the two SRS sets are not transmitted. As a fourth characteristic, the second measurement reference signal resource set includes the aperiodic measurement reference signal resource.

Figure 16:
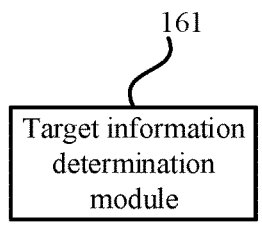
FIG. 16 is a schematic structural diagram of an information determination apparatus provided in some embodiments of the present disclosure.

The embodiments of the present disclosure provide an information determination apparatus. FIG. 16 is a schematic structural diagram of an information determination apparatus provided in some embodiments of the present disclosure. The apparatus is applicable to the determination of a transmission manner of an aperiodic measurement reference signal resource. The information transmission apparatus may be implemented by software and/or hardware, and integrated on user equipment or a base station.

As shown in FIG. 16, the information determination apparatus provided in some embodiments of the present disclosure includes a target information determination module 161. The target information determination module 161 is configured to determine target information according to first information. The first information includes at least one of: a frequency-domain bandwidth group, a control channel resource group, a control channel resource set, and N sets of values of a same type of parameters of an information element, wherein N is a positive integer. The target information includes first-type QCL-RS information or first-type pre-coding information.

The information determination apparatus provided in the embodiments is applicable to the information determination method according to the embodiments of the present disclosure. The implementation principle of the information determination apparatus provided in the embodiments is similar to the information determination method in the embodiments of the present disclosure, and details are not described herein again.

In an exemplary implementation, the target information determination module 161 is configured to, in a case where the target information is the first-type QCL-RS information, perform at least one of the following operations: the control channel resource groups having a same control channel resource group identifier in the frequency-domain bandwidth group correspond to the same first-type QCL-RS information. The control channel resource groups having different control channel resource group identifiers in the frequency-domain bandwidth group respectively correspond to different first-type QCL-RS information. Information elements with a same set index of a same type of parameters in the frequency-domain bandwidth group correspond to the same first-type QCL-RS information. Information elements with different set indexes of the same type of parameters in the frequency-domain bandwidth group respectively correspond to different first-type QCL-RS information. The first-type QCL-RS information of the information elements is determined according to the control channel resource group identifier, and the information elements include information elements scheduled by the control channels in the control channel resource group corresponding to the control channel resource group identifier. The first-type QCL-RS information of the information elements corresponding to the set indexes of the same type of parameters is determined according to the set indexes of the same type of parameters.

In an exemplary implementation, the target information determination module 161 is configured to, in a case where the target information is the first-type QCL-RS information, perform at least one of the following operations: in a case where the number of the control channel resource groups configured in any frequency-domain bandwidth in the frequency-domain bandwidth group is less than A, the first-type QCL-RS information corresponding to the unconfigured control channel resource groups is ignored in the frequency-domain bandwidth. In a case where the number of sets of values of the same type of parameters configured in any frequency-domain bandwidth in the frequency-domain bandwidth group is less than A, the first-type QCL-RS information corresponding to the unconfigured set indexes of the same type of parameters is ignored in the frequency-domain bandwidth, wherein A is an integer greater than or equal to 1.

In an exemplary implementation, the target information determination module 161 is configured to, in a case where the target information is the first-type QCL-RS information, perform at least one of the following operations: a first information element and a second information element respectively correspond to the respective first-type QCL-RS information. The first information element and the second information element are scheduled by the control channel resources in the same control channel resource group in the frequency-domain bandwidth group. The frequency-domain bandwidth in which the first information element is located belongs to the frequency-domain bandwidth group, and the frequency-domain bandwidth in which the second information element is located does not belong to the frequency-domain bandwidth group.

In an exemplary implementation, the target information determination module 161 is configured to, in a case where the target information is the first-type QCL-RS information, perform at least one of the following operations: a first type of information elements and a second type of information elements correspond to the same first-type QCL-RS information, the first type of information elements and the second type of information elements are located in different frequency-domain bandwidths in the frequency-domain bandwidth group and are scheduled by the control channel resource group having the same control channel resource group identifier, and the control channel resource group may or may not be located in the frequency-domain bandwidth group. A third type of information elements and a fourth type of information elements respectively correspond to different first-type QCL-RS information, the third type of information elements and the fourth type of information elements are located in different frequency-domain bandwidths in the frequency-domain bandwidth group and are respectively scheduled by the control channel resource group having different control channel resource group identifiers, and the control channel resource group may or may not be located in the frequency-domain bandwidth group. A fifth type of information elements and a sixth type of information elements correspond to the same first-type QCL-RS information, the fifth type of information elements and the sixth type of information elements are located in different frequency-domain bandwidths in the frequency-domain bandwidth group and are scheduled by the control channel resource group having the same control channel resource group identifier, and the control channel resource group is located in the frequency-domain bandwidth group. A seventh type of information elements and an eighth type of information elements respectively correspond to different first-type QCL-RS information, the seventh type of information elements and the eighth type of information elements are located in different frequency-domain bandwidths in the frequency-domain bandwidth group and are respectively scheduled by the control channel resource group having different control channel resource group identifiers, and the control channel resource group is located in the frequency-domain bandwidth group. A ninth type of information elements and a tenth type of information elements correspond to the same first-type QCL-RS information, the ninth type of information elements and the tenth type of information elements are located in different frequency-domain bandwidths in the frequency-domain bandwidth group and correspond to the same set indexes of a same type of parameters in different frequency-domain bandwidths. An eleventh type of information elements and a twelfth type of information elements respectively correspond to different first-type QCL-RS information, and the eleventh type of information elements and the twelfth type of information elements are located in different frequency-domain bandwidths in the frequency-domain bandwidth group and correspond to different set indexes of a same type of parameters in different frequency-domain bandwidths.

In an exemplary implementation, the target information determination module 161 is configured to perform at least one of the following operations. Downlink information elements corresponding to the same value of the first information share the same first-type QCL-RS information. Downlink information elements corresponding to different values of the first information respectively correspond to different first-type QCL-RS information.

In an exemplary implementation, the shared same first-type QCL-RS information includes at least one of a TCI state list configured by a shared RRC signaling, a TCI state mapping table activated by a shared MAC-CE signaling, a TCI state indicated by a shared DCI signaling, or a shared activated TCI state.

In an exemplary implementation, the frequency-domain bandwidth group meets one of the following conditions. The frequency-domain bandwidth group shares the TCI state list. The control channel resource group having the same control channel resource group identifier in the frequency-domain bandwidth group shares the TCI state list. The control channel resource groups having different control channel resource group identifiers in the frequency-domain bandwidth group correspond to different TCI state lists. The TCI state list is configured by RRC.

In an exemplary implementation, control channel resource set meets one of the following conditions. The control channel resources in the control channel resource set share the TCI state list configured by RRC. The control channel resources in the control channel resource set share the activated TCI state.

In an exemplary implementation, the control channel resource set includes at least one of the following. The control channel resource set includes the control channel resources in at least one or more frequency-domain bandwidths. The control channel resource set includes the control channel resources in the control channel resource group having the same control channel resource group identifier in the frequency-domain bandwidth group.

In an exemplary implementation, the MAC-CE signaling information meets at least one of the following conditions. A total number of activated or updated TCI states in a set of the MAC-CE signaling information is greater than or equal to a maximum number of the TCI states allowed to be activated in the frequency-domain bandwidth. A difference set of the TCI states activated by the set of MAC-CE signaling information in different frequency-domain bandwidths is not null. An intersection of the TCI states activated by the set of the MAC-CE signaling information in different frequency-domain bandwidths is not null. The set of MAC-CE signaling information refers to the TCI state list configured by the RRC signaling corresponding to the frequency-domain bandwidth in each frequency-domain bandwidth of the frequency-domain bandwidth group, and in a case where the TCI state list configured by the RRC signaling corresponding to the frequency-domain bandwidth has no TCI state corresponding to an indication domain, the TCI state corresponding to the indication domain is ignored.

In an exemplary implementation, the uplink target information element meets at least one of the following conditions. Uplink target information elements corresponding to the same value of the first information correspond to a same uplink reference signal set. Uplink target information elements corresponding to different values of the first information respectively correspond to different uplink reference signal sets. The uplink reference signal set is configured by RRC signaling. The first-type pre-coding information of the uplink target information elements is selected from the uplink reference signal set by a control channel scheduling the uplink target information element. The first-type pre-coding information includes at least one or more of a TPMI or a spatial transmitting filter.

In an exemplary implementation, the uplink target information element meets at least one of the following conditions. Uplink target information elements corresponding to the same value of the first information correspond to the same set of the first-type pre-coding information. Uplink target information elements corresponding to different values of the first information respectively correspond to different sets of the first-type pre-coding information.

In an exemplary implementation, the first-type pre-coding information includes at least one of an uplink reference signal set list configured by the RRC signaling, an uplink reference signal set configured by the RRC signaling, an uplink reference signal set activated by the MAC-CE signaling, or an activated uplink reference signal. The pre-coding of the uplink target information element is determined according to the activated uplink reference signal. Alternatively, the pre-coding of the uplink target information element is acquired by scheduling a reference signal selected by the control channel of the uplink target information element from the activated uplink reference signal set.

In an exemplary implementation, the frequency-domain bandwidth group includes one of a BWP group formed by the BWP in a serving cell or a serving cell group formed by at least two serving cells.

In an exemplary implementation, the control channel resource includes at least one of CORESET, a search space, or a DCI format.

In an exemplary implementation, the frequency-domain bandwidths of the frequency-domain bandwidth group meet at least one of the following conditions. The information elements corresponding to the same first information in the different frequency-domain bandwidths in the frequency-domain bandwidth group share updated or activated signaling information of the target information. The frequency-domain bandwidth in which the information elements are located scheduled by the control channel resource in any frequency-domain bandwidth in the frequency-domain bandwidth group belongs to the frequency-domain bandwidth group. The number of the control channel resource groups included in each frequency-domain bandwidth in the frequency-domain bandwidth group is the same. The number of the control channel resource groups included in each frequency-domain bandwidth in the frequency-domain bandwidth group is less than a first predetermined threshold. The number of sets of values of the same type of parameters included in each frequency-domain bandwidth in the frequency-domain bandwidth group is the same. The number of sets of values of the same type of parameters included in each frequency-domain bandwidth in the frequency-domain bandwidth group is less than a second predetermined threshold. In a case where any control channel scheduling the information elements in the frequency-domain bandwidth does not include an indication domain of the first-type QCL-RS information, the shared first-type QCL-RS information corresponding to the frequency-domain bandwidth group is ignored in the frequency-domain bandwidth, and the frequency-domain bandwidth belongs to the frequency-domain bandwidth group. In a case where any control channel scheduling the information elements in the frequency-domain bandwidth and belonging to the control channel resource group does not include the indication domain of the first-type QCL-RS information of the information elements, the shared first-type QCL-RS information corresponding to the control channel resource group of the frequency-domain bandwidth group is ignored in the frequency-domain bandwidth.

The control channel resource group is the control channel resource group in any frequency-domain bandwidth in the frequency-domain bandwidth group.

The information element is the information element in any frequency-domain bandwidth in the frequency-domain bandwidth group.

A set of values of the same type of parameters corresponds to the information element in any frequency-domain bandwidth in the frequency-domain bandwidth group.

In an exemplary implementation, the first-type QCL-RS information includes at least one of the following. The first-type QCL-RS information includes the TCI state mapping table, the TCI state mapping table includes a mapping relationship between a code point of a TCI indication domain in DCI and the TCI state index, and the QCL-RS of the information element is acquired according to the value of the TCI indication domain indicated in a physical layer control channel scheduling the information element and the TCI state mapping table of the information element. The first-type QCL-RS information includes one TCI state or multiple TCI states, and the QCL-RS of the information element includes a TCI state in the one TCI state or the multiple TCI states.

In an exemplary implementation, the TCI state mapping table meets at least one of the following conditions. The control channel resource groups with the same control channel resource group identifier in different frequency-domain bandwidths in the frequency-domain bandwidth group share the same TCI state mapping table. The information elements with the same set index of the same type of parameters in different frequency-domain bandwidths in the frequency-domain bandwidth group share the same TCI state mapping table. The TCI state mapping table is an acquisition parameter of a QCL-RS of a downlink data channel in the frequency-domain bandwidth in the frequency-domain bandwidth group. Different TCI state mapping tables are activated or updated by the MAC-CE signaling, or different TCI state mapping tables are respectively activated or updated by different signaling portions of the MAC-CE signaling. The different TCI state mapping tables correspond to different control channel resource groups of the frequency-domain bandwidth group, or the different TCI state mapping tables correspond to different set indexes of a same type of parameters of the frequency-domain bandwidth group. Multiple frequency-domain bandwidths in the frequency-domain bandwidth group share the TCI state mapping table, including the same TCI state index in the TCI state mapping table corresponding to different TCI state lists in the different frequency-domain bandwidths, or the QCL-RS of the first type of QCL parameters associated with the same TCI state index in the TCI state mapping table corresponds to the reference signal in the frequency-domain bandwidth in each frequency-domain bandwidth, a reference signal resource index corresponding to the reference signal differs by a predetermined value, and the predetermined value is an integer.

In an exemplary implementation, the TCI states included in the TCI state list meet at least one of the following conditions. A difference set between sets of the TCI states included in the TCI state lists of different frequency-domain bandwidths in the frequency-domain bandwidth group is null. An intersection of the sets of the TCI states included in the TCI state lists of different frequency-domain bandwidths in the frequency-domain bandwidth group is not null. TCI states included in a predetermined TCI state list belong to the set of the TCI states included in the TCI state list in each frequency-domain bandwidth in the frequency-domain bandwidth group. A frequency-domain bandwidth index corresponding to the predetermined TCI state list is included in the MAC-CE signaling for updating or activating the TCI state mapping table.

In an exemplary implementation, the first type of QCL parameters includes at least one of Doppler shift, Doppler spread, average delay, delay spread, a spatial receiving parameter, or average gain.

Figure 17:
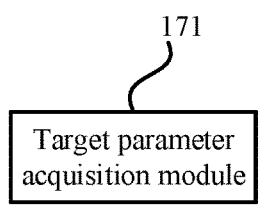
FIG. 17 is a schematic structural diagram of an information acquisition apparatus provided in some embodiments of the present disclosure.

The embodiments of the present disclosure provide an information acquisition apparatus. FIG. 17 is a schematic structural diagram of an information acquisition apparatus provided in some embodiments of the present disclosure. The apparatus is applicable to acquiring a situation of a transmission beam corresponding to a target channel and/or signal. The information acquisition apparatus may be implemented by software and/or hardware, and integrated on user equipment or a base station.

As shown in FIG. 17, the information acquisition apparatus provided in the embodiments of the present disclosure mainly includes a target parameter acquisition module 171. The target parameter acquisition module 171 is configured to acquire a target parameter according to a downlink information element and second information. The second information includes at least one of: timing advance information, a predetermined parameter, a number of repeated transmissions of an uplink target information element, a time-domain behavior parameter of the uplink target information element, a predetermined CC group, and a correspondence relationship between the downlink information element and an uplink target information element. The target parameter is spatial transmitting filter information of an uplink target information element.

The information acquisition apparatus provided in the embodiments is applicable to the information acquisition method according to the embodiments of the present disclosure. The implementation principle of the information acquisition apparatus provided in the embodiments is similar to the information acquisition method in the embodiments of the present disclosure, and details are not described herein again.

In an exemplary implementation, the target parameter acquisition module 171 is configured to, in a case where the second information includes the correspondence relationship between the downlink information element and the uplink target information element, perform at least one of the following operations. After a QCL-RS of the downlink information element is updated, the target parameter is updated. After a QCL-RS, associated with the receiving filter, of the downlink information element is updated, the target parameter is updated. Between two updates of the correspondence relationship between the downlink information element and the uplink target information element, the target parameter is acquired according to the same downlink information element. The correspondence relationship between the downlink information element and the uplink target information element is determined according to at least one of signaling information and a predetermined rule.

In an exemplary implementation, the target parameter acquisition module 171 is configured to, in a case where the second information includes the number of repeated transmissions of the uplink target information element and the number A of repeated transmissions of the uplink information element is greater than a preset threshold, perform at least one of the following operations. The target parameter corresponding to each repeated transmission of the A repeated transmissions is acquired based on the same downlink information element. The target parameter corresponding to each repeated transmission of the A repeated transmissions is acquired based on the downlink information element corresponding to each repeated transmission. In a case where A repeated transmissions include B repeated transmission groups, and uplink target information elements are in a same repeated transmission group, the target parameter corresponding to each repeated transmission is acquired based on the same downlink information element. In a case where A repeated transmissions include B repeated transmission groups, and uplink target information elements are in different repeated transmission groups, the target parameter corresponding to each repeated transmission is acquired based on the downlink information elements corresponding to the repeated transmission groups, respectively.

B is a positive integer less than or equal to A.

In an exemplary implementation, the repeated transmission groups meet at least one of the following conditions. Each repeated transmission group includes one or more consecutive repeated transmissions. Each repeated transmission group includes one or more non-consecutive repeated transmissions. A minimum interval between the repeated transmissions included in each repeated transmission group is X repeated transmissions, wherein X is a positive integer greater than or equal to 1.

In an exemplary implementation, the target parameter acquisition module 171 is configured to, in a case where the second information includes the time-domain behavior parameter of the uplink target information element, perform at least one of the following operations. In a period group of the uplink target information element, the target parameter is acquired based on the same downlink information element, and the period group includes periods of one or more uplink target information elements. In different period groups of the uplink target information elements, the target parameter is acquired based on the downlink information elements corresponding to the respective period groups, and the period group includes the periods of one or more uplink target information elements. In a case where the uplink target information element is a period uplink information element, the target parameter is acquired in a first manner. In a case where the uplink target information element is a semi-persistent uplink information element, the target parameter is acquired in a second manner. In a case where uplink target information element is an uplink information element scheduled by dynamic signaling, the target parameter is acquired in a preset third manner.

The first manner, the second manner, and the third manner are different from each other.

In an exemplary implementation, the time-domain behavior parameter of the uplink target information element includes at least one of: a period of the uplink target information element, a period offset of the uplink target information element, or periodic, semi-persistent, or aperiodic characteristics of the uplink target information element.

In an exemplary implementation, the target parameter acquisition module 171 is configured to acquire the target parameter according to the downlink information element in the second time unit. The second time unit is acquired according to a time unit in which the uplink target information element is located.

In an exemplary implementation, the target parameter acquisition module 171 is configured to acquire the target parameter according to a physical layer dynamic control channel for scheduling a predetermining channel. The predetermining channel includes a triggering signaling of the semi-persistent information element.

In an exemplary implementation, the target parameter acquisition module 171 is configured to acquire the target parameter according to a physical layer dynamic control channel for scheduling the aperiodic uplink information element.

In an exemplary implementation, the target parameter acquisition module 171 is configured to, in a case where the uplink target channel includes a PUCCH, perform the following operation. The target parameter is acquired according to the last PDCCH in D PDCCHs. An acquisition parameter for an index of the PDCCH includes a second predetermined CC group. Each PDCCH in the D PDCCHs corresponds to a set of HARQ-ACK information. The PUCCH includes D sets of HARQ-ACK information corresponding to the D PDCCHs.

In an exemplary implementation, the number of the CCs included in the second predetermined CC group is less than or equal to the number of the CCs configured in MCG or SCG. The number of the CCs included in the second predetermined CC group is less than or equal to the number of the CCs included in the CC set composed of the CCs in which the D PDCCHs are located. The second predetermined CC group only includes the downlink CC corresponding to the CC wherein the PUCCH is located. The resource indication information of the PUCCH is acquired by the first PDCCH in the D PDCCHs, and the spatial transmitting filter information of the PUCCH is acquired according to the last PDCCH in the D PDCCHs. In the same PDCCH occasion, indexes of the PDCCHs decrease progressively according to CC indexes in the second predetermined CC group, and the PDCCHs are sorted according to an ascending order of the PDCCH occasion.

An acquisition norm of the first PDCCH is different from an acquisition norm of the last PDCCH.

In an exemplary implementation, the downlink information element is in the second time unit. An acquisition parameter of the second time unit includes the second information.

In an exemplary implementation, the downlink information element includes at least one of: a control channel resource having a predetermined characteristic in a second time unit, and a downlink information element in a first preset CC group in the second time unit.

In an exemplary implementation, the second time unit includes at least one of: a time unit included in the time unit of the control channel resource and closest to the uplink target information element, wherein an uplink frame has a TA relative to a downlink frame, and the downlink channel includes the control channel resource; a time unit acquired based on the predetermined parameter of the downlink information element; a time unit acquired based on the predetermined parameter of the uplink target information element; a time unit acquired based on a predetermined parameter of a control channel resource for scheduling the uplink target information element; a time unit closest to the uplink target information element in a time unit including a control channel resource before the predetermined time for transmitting the uplink target information element, wherein an uplink frame has a TA relative to a downlink frame; and a minimum time interval between an end position of the second time unit and time for transmitting the uplink target information element is greater than or equal to a predetermined time interval, wherein the predetermined time interval is acquired according to a minimum time interval between an end position of the PDCCH for scheduling the uplink channel and/or signal and the uplink channel and/or signal.

In an exemplary implementation, the control channel resource having the predetermined characteristic meets at least one of the following conditions. There is a correspondence relationship between a CC in which the control channel resource is located and a CC in which the uplink target information element is located. A CC in which the control channel resource is located and a CC in which the uplink target information element is located are included in a same serving cell. A CC in which the control channel resource is located belongs to the first preset CC group. A control channel resource identifier of the control channel resource is the minimum or maximum among control channel resources included in the second time unit. In the second time unit, most time-domain symbols are occupied by a monitoring occasion of the control channel resource among control channel resources included in the second time unit. A period of a monitoring occasion of the control channel resource is the shortest among control channel resources included in the second time unit. In the second time unit, the control channel resource is associated with at least one search space to be detected. The control channel resource belongs to one control channel resource group, wherein there is a correspondence relationship between the control channel resource group and the target uplink information element.

In an exemplary implementation, the target parameter acquisition module 171 is configured to perform at least one of the following operations. The target parameter is acquired according to a receiving filter of the downlink information element. The target parameter is acquired according to a QCL-RS, associated with a spatial receiving parameter, of the downlink information element. The target parameter is acquired according to a demodulation reference signal of the downlink information element.

In an exemplary implementation, the predetermined parameter includes at least one of a sub-carrier spacing, a CP length, a time-domain symbol length, and a slot length.

In an exemplary implementation, the predetermined parameter includes at least one of: a predetermined parameter of the downlink information element, a predetermined parameter of the uplink target information element, a predetermined parameter with a maximum sub-carrier spacing among the predetermined parameter of the downlink information element and the predetermined parameter of the uplink target information element, or a predetermined parameter with a minimum sub-carrier spacing among the predetermined parameter of the downlink information element and the predetermined parameter of the uplink target information element.

Figure 18:
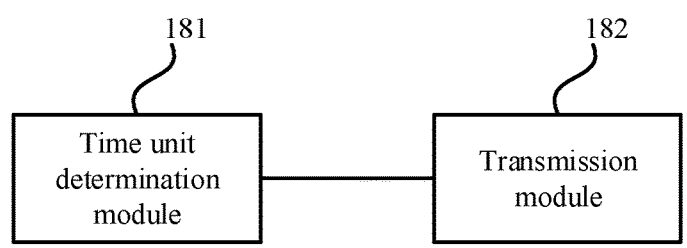
FIG. 18 is a schematic structural diagram of an information transmission apparatus provided in some embodiments of the present disclosure.

The embodiments of the present disclosure provide an information transmission apparatus. FIG. 18 is a schematic structural diagram of an information transmission apparatus provided in some embodiments of the present disclosure. The apparatus is applicable to determining the QCL-RS corresponding to the target channel and/or signal. The information determination apparatus may be implemented by software and/or hardware, and integrated on user equipment or a base station.

As shown in FIG. 18, the information transmission apparatus mainly includes a time unit determination module 181 and a transmission module 182. The time unit determination module 181 is configured to determine, according to third information, a time unit in which an aperiodic measurement reference signal resource is located. The transmission module 182 is configured to transmit the aperiodic measurement reference signal resource in the time unit in which the aperiodic measurement reference signal resource is located. The third information includes at least one of: a minimum time interval between a PDCCH scheduling the aperiodic measurement reference signal resource and the aperiodic measurement reference signal resource, a first predetermined time interval, slot structure information, a predetermined time window, a predetermined parameter, a first measurement reference signal resource set in which the aperiodic measurement reference signal resource is located, and a second measurement reference signal resource set.

The information transmission apparatus provided in the embodiments is applicable to the information transmission method according to the embodiments of the present disclosure. The implementation principle of the information transmission apparatus provided in the embodiments is similar to the information transmission method in the embodiments of the present disclosure, and details are not described herein again.

In an exemplary implementation, the minimum time interval between the PDCCH scheduling the aperiodic measurement reference signal resource and the aperiodic measurement reference signal resource is acquired according to at least one of the following: a transmission direction of the aperiodic measurement reference signal resource, wherein the transmission direction includes uplink transmission and downlink transmission; a relationship between a carrier in which the PDCCH is located and a carrier in which the aperiodic measurement reference signal resource is located; a relationship between the predetermined parameter information of the PDCCH and the predetermined parameter information of the aperiodic measurement reference signal resource; the predetermined parameter information of the PDCCH; and the predetermined parameter information of the aperiodic measurement reference signal resource.

In an exemplary implementation, a determining manner for the minimum time interval includes at least one of the following manners. In a case where the aperiodic measurement reference signal resource is an uplink aperiodic measurement reference signal resource, the minimum time interval is determined according to capability information reported by a communication node, wherein the communication node includes a communication node transmitting the uplink aperiodic measurement reference signal resource. In a case where the PDCCH and the aperiodic measurement reference signal resource are on the same carrier, a first time interval is determined as the minimum time interval. In a case where the PDCCH and the aperiodic measurement reference signal resource are on different carriers, a second time interval is determined as the minimum time interval. In a case where the predetermined parameter of the PDCCH is the same as the predetermined parameter of the aperiodic measurement reference signal resource, a third time interval is determined as the minimum time interval. In a case where the predetermined parameter of the PDCCH is different from the predetermined parameter of the aperiodic measurement reference signal resource, a fourth time interval is determined as the minimum time interval. The predetermined parameter includes a sub-carrier spacing. The first time interval is less than the second time interval, and/or the third time interval is less than the fourth time interval.

In an exemplary implementation, the time unit determination module 181 is configured to determine, according to the third information, the time unit in which the aperiodic measurement reference signal resource is located in a case where a predetermined condition is met. The predetermined condition includes one of the following conditions: there is no time unit interval configured in the first measurement reference signal resource set; there is no time unit interval configured in the first measurement reference signal resource set, and at least one QCL-RS associated with the spatial receiving parameter is configured or activated in a frequency-domain bandwidth in which the aperiodic measurement reference signal resource is located; there is no time unit interval configured in the first measurement reference signal resource set, and the carrier in which the aperiodic measurement reference signal resource is located belongs to FR2; the time unit determined according to the time unit interval configured in the first measurement reference signal resource set is not an available time unit; and the time unit interval in the first measurement reference signal resource set is a predetermined value.

In an exemplary implementation, the time unit determination module 181 includes at least one of the following. After the minimum time interval after the PDCCH, the first available time unit is the time unit in which the aperiodic measurement reference signal resource is located. After the first predetermined time interval after the PDCCH, the first available time unit is the time unit in which the aperiodic measurement reference signal resource is located, wherein the first available time unit is acquired according to the third information. Within a predetermined time window range after the PDCCH, in a case where the available time unit is not found for any of the first measurement reference signal resource set and the second measurement reference signal resource set, the measurement reference resource is not received.

In an exemplary implementation, the available time unit meets at least one of the following conditions. The available time unit is in the predetermined time window after the PDCCH. On each time-domain symbol in a first time-domain symbol set in the available time unit, a transmission direction on the time-domain symbol does not conflict with a transmission direction of the aperiodic measurement reference signal resource, wherein the transmission direction on the time-domain symbol is determined according to the slot structure information. On each time-domain symbol in a first time-domain symbol set in the available time unit, each aperiodic measurement reference signal resource in the first measurement reference signal resource set on the time-domain symbol in the available time unit does not conflict with the QCL-RS of a second downlink channel and/or signal on the time-domain symbol with respect to the spatial receiving parameter, wherein the aperiodic measurement reference signal is a downlink aperiodic measurement signal. On each time-domain symbol in a first time-domain symbol set in the available time unit, each aperiodic measurement reference signal resource in the first measurement reference signal resource set on the time-domain symbol and a spatial transmitting filter of a second uplink channel and/or signal on the time-domain symbol are able to be transmitted simultaneously by a communication node, wherein the communication node is a communication node transmitting the aperiodic measurement reference signal, and the aperiodic measurement reference signal is an uplink aperiodic measurement signal. Between the PDCCH and the available time unit, the slot structure information does not change. The time interval between the latest PDCCH including the slot structure information before the available time unit and a starting symbol of the aperiodic measurement reference signal resource in the available time unit is greater than or equal to the first predetermined time interval. Within the predetermined time window after the PDCCH, the slot structure information is not changed. Between the PDCCH and the first available time unit, the same slot structure information is adopted. Within the predetermined time window after the PDCCH, the same slot structure information is adopted.

In an exemplary implementation, the first time-domain symbol set includes one of the following time-domain symbol sets within one time unit: a set of time-domain symbols including all time-domain symbols occupied by the aperiodic measurement reference signal resource; a set of time-domain symbols including all time-domain symbols occupied by all measurement reference signal resources in the first measurement reference signal resource set; a set of time-domain symbols including all time-domain symbols occupied by all measurement reference signal resources in the first measurement reference signal resource set and the second measurement reference signal resource set.

In an exemplary implementation, the slot structure information is acquired according to at least the following information: a time-domain symbol position in which a synchronization signal is located; a semi-static frame structure; DCI format 2_0; and a time-domain symbol in which a PRACH is located. The slot structure information in each time unit after the PDCCH includes available slot structure information in each time unit.

In an exemplary implementation, the time unit includes one of a slot, a sub-frame, or a sub-slot. One sub-slot includes one or more consecutive time-domain symbols in one slot.

In an exemplary implementation, the first predetermined time interval includes: a minimum time interval between the PDCCH and the aperiodic measurement reference signal required to apply a first predetermined parameter to transmission of the aperiodic measurement reference signal. The first predetermined parameter includes one of: spatial transmitting filter information, a QCL-RS, or a QCL-RS associated with a spatial receiving parameter. The first predetermined parameter is indicated by a control channel for scheduling the aperiodic measurement reference signal. The predetermined parameter includes the first predetermined parameter. Alternatively, the first predetermined time interval includes: a second predetermined parameter indicated by the control channel for scheduling the aperiodic measurement reference signal is applied to the transmission of the aperiodic reference signal, wherein a time interval between the latest PDCCH including the slot structure information before the available time unit and a starting symbol of the aperiodic measurement reference signal resource in the available time unit is greater than or equal to the first predetermined time interval.

In an exemplary implementation, the predetermined parameter includes the second predetermined parameter. The second predetermined parameter includes a sub-carrier spacing.

In an exemplary implementation, the second measurement reference signal resource set meets at least one of the following characteristics. As a first characteristic, the first measurement reference signal resource set and the second measurement reference signal resource set are associated with a same measurement reporting setting. As a second characteristic, one of the first measurement reference signal resource set and the second measurement reference signal resource set is a channel measurement reference signal resource set, and the other is an interference measurement reference signal resource set. As a third characteristic, the first measurement reference signal resource set corresponds to an antenna port group 1, and the second measurement reference signal resource set corresponds to an antenna port group 2, wherein a difference set of the antenna port group 1 and the antenna port group 2 is not null, and/or an intersection of the antenna port group 1 and the antenna port group 2 is null The second measurement reference signal resource set includes the aperiodic measurement reference signal resource.

Figure 19:
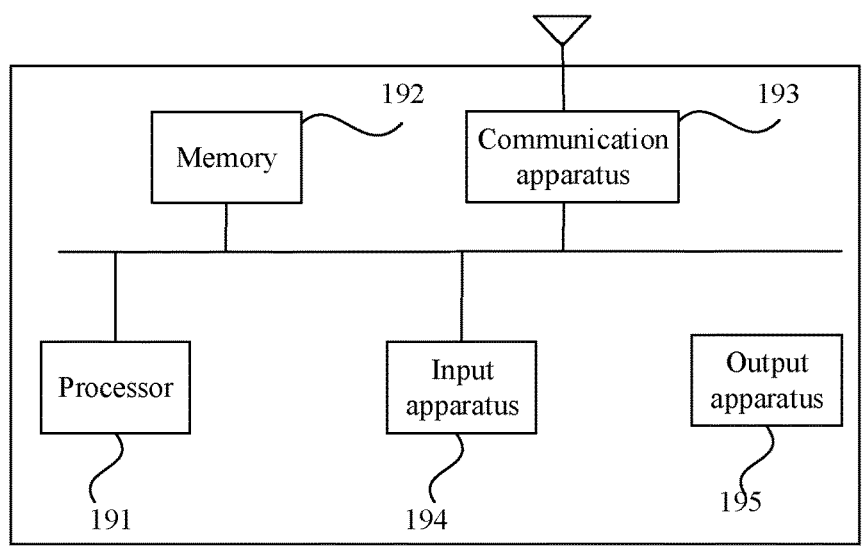
FIG. 19 is a schematic structural diagram of a device provided in some embodiments of the present disclosure.

The embodiments of the present disclosure provide a device. FIG. 19 is a schematic structural diagram of a device provided in some embodiments of the present disclosure. As shown in FIG. 19, the device provided in some embodiments of the present disclosure includes at least one processor 191 and a memory 192. There is at least one processor 191 in the device. In FIG. 19, one processor 191 is used as an example.

The memory 192 is configured to store at least one program. The at least one program are performed by the at least one processor 191, so that the at least one processor 191 implement the method according to the embodiments of the present disclosure.

The device further includes a communication apparatus 193, an input apparatus 194, and an output apparatus 195.

The processor 191, the memory 192, the communication apparatus 193, the input apparatus 194, and the output apparatus 195 may be connected by a bus or in other manners. In FIG. 19, connection by the bus is used as an example.

The input apparatus 194 may be configured to receive inputted numbers or character information, and generate a key signal input related to user setting and function control of the device. The output apparatus 195 may include other display devices such as a display screen.

The communication apparatus 193 may include a receiver and a transmitter. The communication apparatus 193 is configured to transmit and receive information according to the control of the processor 191.

As a computer-readable storage medium, the memory 192 may be configured to store a software program, a computer-executable program, and a module, for example, program instructions/modules corresponding to the information determination method described in the embodiments of the present disclosure (for example, the target information determination module 161 in the information determination apparatus), for another example, program instructions/modules corresponding to the information acquisition method described in the embodiments of the present disclosure (for example, the target parameter acquisition module 171 in the information acquisition apparatus), and for still another example, program instructions/modules corresponding to the information transmission method described in the embodiments of the present disclosure (for example, the time unit determination module 181 and the transmission module 182 in the information transmission apparatus). The memory 192 may include a program storage area region and a data storage area. The program storage area may store an operating system and an application program required for at least one function. The data storage area may store data created according to use of the device. In addition, the memory 192 may include a high-speed random access memory, and may further include a non-volatile memory, for example, at least one disk memory devices, a flash memory device, or other non-volatile solid state memory devices. In some embodiments, the memory 192 may further include memories remotely disposed relative to the processor 191. The remote memories may be connected to the device by a network. Examples of the above network include, but are not limited to, the Internet, an intranet, a local area network, a mobile communication network, and a combination thereof.

The embodiments of the present disclosure provide a storage medium. The storage medium is configured to store a computer program. The computer program is used for implementing any of the methods according to the embodiments of the present disclosure when executed by a processor.

When any of the information determination method according to the embodiments of the present disclosure is implemented, the method includes determining target information according to first information. The first information includes at least one or more of a frequency-domain bandwidth group, a control channel resource group, a control channel resource set, and N sets of values of a same type of parameters of an information element, wherein N is a positive integer. The target information includes first-type QCL-RS information or first-type pre-coding information.

When any of the information acquisition method according to the embodiments of the present disclosure is implemented, the method includes acquiring a target parameter according to a downlink information element and second information. The second information includes at least one or more of timing advance information, parameter set information, a number of repeated transmissions of an uplink target information element, a time-domain behavior parameter of the uplink target information element, a predetermined CC group, and a correspondence relationship between the downlink information element and an uplink target information element. The target parameter is spatial transmitting filter information of an uplink target information element.

When any of the information transmission method according to the embodiments of the present disclosure is implemented, the method includes determining, according to third information, a time unit in which an aperiodic measurement reference signal resource is located; and transmitting the aperiodic measurement reference signal resource in the time unit in which the aperiodic measurement reference signal resource is located. The third information includes at least one of: a minimum time interval between a PDCCH scheduling the aperiodic measurement reference signal resource and the aperiodic measurement reference signal resource, a first predetermined time interval, slot structure information, a predetermined time window, a predetermined parameter, a first measurement reference signal resource set in which the aperiodic measurement reference signal resource is located, and a second measurement reference signal resource set.

The above descriptions are merely exemplary embodiments of the present disclosure, and are not intended to limit the protection scope of the present disclosure.

Those having ordinary skill in the art should understood that the term user terminal encompasses any suitable type of wireless user equipment such as a mobile telephone, a portable data processing apparatus, a portable web browser, or vehicle mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that may be executed by a controller, a microprocessor or other computing apparatus, although the application is not limited thereto.

Embodiments of the present disclosure may be implemented by the execution of computer program instructions by a data processor of a mobile apparatus, for example, in a processor entity, or by hardware, or by a combination of software and hardware. Computer program instructions may be assembly instructions, Instruction Set Architecture (ISA) instructions, machine instructions, machine dependent instructions, microcodes, firmware instructions, state setting data, or source codes or object codes written in any combination of one or more programming languages.

The block diagrams of any logic flow in the figures of the present disclosure may represent program operations, or may represent interconnected logic circuits, modules, and functions, or may represent a combination of program operations and logic circuits, modules, and functions. The computer program can be stored on the memory. The memory may be of any type suitable for the local technical environment and may be implemented using any suitable data storage technology, such as, but not limited to, Read-Only Memory (ROM), Random Access Memory (RAM), optical memory devices and systems (Digital Video Disc (DVD) or Compact Disk (CD)). The computer-readable medium may include a non-transitory storage medium. The data processor may be of any type suitable for the local technical environment, such as, but not limited to, a general purpose computer, a special purpose computer, a microprocessor, a Digital Signal Processing (DSP), an Application Specific Integrated Circuit (ASIC), programmable logic devices (Field Programmable Gate Array, FPGA) and processors based on a multi-core processor architecture.

What is claimed is:

1. An information acquisition method, comprising:
  acquiring a spatial transmitting filter information of an uplink target information element according to a downlink information element corresponding to the uplink target information element and second information, wherein the second information comprises a number of repeated transmissions of the uplink target information element,
  wherein acquiring the spatial transmitting filter information of the uplink target information element according to the downlink information element and the second information comprises one of the following:
  acquiring the spatial transmitting filter information of the uplink target information element according to a receiving filter of the downlink information element; or
  acquiring the spatial transmitting filter information of the uplink target information element according to a Quasi Co-Location-Reference Signal (QCL-RS) associated with a spatial receiving parameter, of the downlink information element.

2. The method according to claim 1, wherein a correspondence relationship between the downlink information element and the uplink target information element is determined according to signaling information and a predetermined rule.

3. The method according to claim 1, wherein in a case where the number A of repeated transmissions of the uplink information element is greater than a set threshold, acquiring the spatial transmitting filter information of the uplink target information element according to the downlink information element and the second information comprises:
  acquiring the spatial transmitting filter information of the uplink target information element corresponding to each repeated transmission of the A repeated transmissions based on the same downlink information element.

4. The method according to claim 1, wherein the downlink information element comprises a control channel resource having a predetermined characteristic in a second time unit,
  wherein the control channel resource having the predetermined characteristic meets at least one of the following conditions:
  a serving cell in which the control channel resource is located and a serving cell in which the uplink target information element is located are a same serving cell;
  a control channel resource identifier of the control channel resource is the minimum among control channel resources comprised in the second time unit; or
  the control channel resource belongs to one control channel resource group, wherein there is a correspondence relationship between the control channel resource group and the uplink target information element.

5. The method according to claim 1, wherein in a case where the number A of repeated transmissions of the uplink information element is greater than a set threshold, acquiring the spatial transmitting filter information of the uplink target information element according to the downlink information element and the second information comprises:
  acquiring the spatial transmitting filter information of the uplink target information element corresponding to each repeated transmission of the A repeated transmissions according to the downlink information element corresponding to the first repeated transmission in A repeated transmissions.

6. The method according to claim 1, further comprising:
  determining target information according to first information, wherein the first information comprises a frequency-domain bandwidth group and a control channel resource group, and the target information comprises first-type Quasi Co-Location-Reference Signal (QCL-RS) information or first-type pre-coding information.

7. An information acquisition apparatus, comprising at least one processor, and a memory, configured to store at least one program, wherein the at least one program, when executed by the at least one processor, causes the at least one processor to:
  acquire a spatial transmitting filter information of an uplink target information element according to a downlink information element corresponding to the uplink target information element and second information, wherein the second information comprises a number of repeated transmissions of the uplink target information element,
  wherein the at least one program, when executed by the at least one processor, causes the at least one processor to acquire the spatial transmitting filter information of the uplink target information element in one of the following manners:
  acquiring the spatial transmitting filter information of the uplink target information element according to a receiving filter of the downlink information element; or
  acquiring the spatial transmitting filter information of the uplink target information element according to a Quasi Co-Location-Reference Signal (QCL-RS) associated with a spatial receiving parameter, of the downlink information element.

8. A non-transitory storage medium, storing a computer program, and the method according to claim 1 being implemented when the computer program is executed by a processor.

9. The method according to claim 6, wherein frequency-domain bandwidths of the frequency-domain bandwidth group meet at least one of the following conditions:
  the number of the control channel resource groups comprised in each frequency-domain bandwidth in the frequency-domain bandwidth group is the same;
  the number of the control channel resource groups comprised in each frequency-domain bandwidth in the frequency-domain bandwidth group is less than a first predetermined threshold.

10. The method according to claim 6, wherein in a case where the target information is the first-type QCL-RS information, determining the target information according to the first information comprises at least one of the following:
  a first type of information elements and a second type of information elements correspond to the same first-type QCL-RS information, wherein the first type of information elements and the second type of information elements are located in different frequency-domain bandwidths in the frequency-domain bandwidth group and are scheduled by the control channel resource group having the same control channel resource group identifier, and the control channel resource group is or is not located in the frequency-domain bandwidth group;

a third type of information elements and a fourth type of information elements respectively correspond to different first-type QCL-RS information, wherein the third type of information elements and the fourth type of information elements are located in different frequency-domain bandwidths in the frequency-domain bandwidth group and are respectively scheduled by the control channel resource group having different control channel resource group identifiers, and the control channel resource group is or is not located in the frequency-domain bandwidth group;

a ninth type of information elements and a tenth type of information elements correspond to the same first-type QCL-RS information, wherein the ninth type of information elements and the tenth type of information elements are located in different frequency-domain bandwidths in the frequency-domain bandwidth group and correspond to the same set indexes of a same type of parameters in different frequency-domain bandwidths, wherein the first information includes N set of values of the same type of parameters of an information element and N is an positive integer;

an eleventh type of information elements and a twelfth type of information elements respectively correspond to different first-type QCL-RS information, wherein the eleventh type of information elements and the twelfth type of information elements are located in different frequency-domain bandwidths in the frequency-domain bandwidth group and correspond to different set indexes of a same type of parameters in different frequency-domain bandwidths, wherein the first information includes N set of values of the same type of parameters of an information element and N is an positive integer.

11. The method according to claim 6, wherein determining the target information according to the first information comprises at least one of the following:

downlink information elements corresponding to a same value of the first information share the same first-type QCL-RS information; and downlink information elements corresponding to different values of the first information respectively correspond to different first-type QCL-RS information;

wherein that downlink information elements share the same first-type QCL-RS information comprises at least one of the following:

share a TCI state list configured by RRC signaling, share a TCI state mapping table activated by an MAC-CE signaling, share a TCI state indicated by a DCI signaling, and share an activated TCI state.

12. The method according to claim 6, wherein at least one of the following is satisfied:

uplink target information elements corresponding to a same value of the first information correspond to a same uplink reference signal set;

uplink target information elements corresponding to different values of the first information respectively correspond to different uplink reference signal set;

uplink target information elements corresponding to a same value of the first information correspond to the same set of the first-type pre-coding information;

uplink target information elements corresponding to different values of the first information respectively correspond to different sets of the first-type pre-coding information;

wherein the same or the different uplink reference signal sets are configured by RRC signaling, the first-type pre-coding information of the uplink target information elements is selected from the uplink reference signal set by a control channel scheduling the uplink target information element, and the first-type pre-coding information comprises at least one or more of a Transmitted Pre-coding Matrix Indicator (TPMI) or a spatial transmitting filter.

13. The apparatus according to claim 7, wherein a correspondence relationship between the downlink information element and the uplink target information element is determined according to signaling information and a predetermined rule.

14. The apparatus according to claim 7, wherein in a case where the number A of repeated transmissions of the uplink information element is greater than a set threshold, the at least one program, when executed by the at least one processor, causes the at least one processor to acquire the spatial transmitting filter information of the uplink target information element in one of the following manners:

acquiring the spatial transmitting filter information of the uplink target information element corresponding to each repeated transmission of the A repeated transmissions based on the same downlink information element;

acquiring the spatial transmitting filter information of the uplink target information element corresponding to each repeated transmission of the A repeated transmissions according to the downlink information element corresponding to the first repeated transmission in A repeated transmissions.

15. The apparatus according to claim 7, wherein the downlink information element comprises a control channel resource having a predetermined characteristic in a second time unit, wherein the control channel resource having the predetermined characteristic meets at least one of the following conditions:

a serving cell in which the control channel resource is located and a serving cell in which the uplink target information element is located are a same serving cell;

a control channel resource identifier of the control channel resource is the minimum among control channel resources comprised in the second time unit; or the control channel resource belongs to one control channel resource group, wherein there is a correspondence relationship between the control channel resource group and the uplink target information element.

16. The apparatus according to claim 7, wherein the at least one program, when executed by the at least one processor, further causes the at least one processor to:

determine target information according to first information, wherein the first information comprises a frequency-domain bandwidth group and a control channel resource group, and the target information comprises first-type Quasi Co-Location-Reference Signal (QCL-RS) information or first-type pre-coding information.

17. The apparatus according to claim 16, wherein frequency-domain bandwidths of the frequency-domain bandwidth group meet at least one of the following conditions:

the number of the control channel resource groups comprised in each frequency-domain bandwidth in the frequency-domain bandwidth group is the same;

the number of the control channel resource groups comprised in each frequency-domain bandwidth in the frequency-domain bandwidth group is less than a first predetermined threshold.

18. The apparatus according to claim 16, wherein in a case where the target information is the first-type QCL-RS information, the at least one program, when executed by the at least one processor, further causes the at least one processor to determine the target information according to the first information in at least one of the following manners:
- a first type of information elements and a second type of information elements correspond to the same first-type QCL-RS information, wherein the first type of information elements and the second type of information elements are located in different frequency-domain bandwidths in the frequency-domain bandwidth group and are scheduled by the control channel resource group having the same control channel resource group identifier, and the control channel resource group is or is not located in the frequency-domain bandwidth group;
- a third type of information elements and a fourth type of information elements respectively correspond to different first-type QCL-RS information, wherein the third type of information elements and the fourth type of information elements are located in different frequency-domain bandwidths in the frequency-domain bandwidth group and are respectively scheduled by the control channel resource group having different control channel resource group identifiers, and the control channel resource group is or is not located in the frequency-domain bandwidth group;
- a ninth type of information elements and a tenth type of information elements correspond to the same first-type QCL-RS information, wherein the ninth type of information elements and the tenth type of information elements are located in different frequency-domain bandwidths in the frequency-domain bandwidth group and correspond to the same set indexes of a same type of parameters in different frequency-domain bandwidths, wherein the first information includes N set of values of the same type of parameters of an information element and N is an positive integer;
- an eleventh type of information elements and a twelfth type of information elements respectively correspond to different first-type QCL-RS information, wherein the eleventh type of information elements and the twelfth type of information elements are located in different frequency-domain bandwidths in the frequency-domain bandwidth group and correspond to different set indexes of a same type of parameters in different frequency-domain bandwidths, wherein the first information includes N set of values of the same type of parameters of an information element and N is an positive integer.

19. The apparatus according to claim 16, wherein the at least one program, when executed by the at least one processor, further causes the at least one processor to determine the target information according to the first information in at least one of the following manners:
- downlink information elements corresponding to a same value of the first information share the same first-type QCL-RS information; and
- downlink information elements corresponding to different values of the first information respectively correspond to different first-type QCL-RS information;
- wherein that downlink information elements share the same first-type QCL-RS information comprises at least one of the following:
- share a TCI state list configured by RRC signaling,
- share a TCI state mapping table activated by an MAC-CE signaling,
- share a TCI state indicated by a DCI signaling, and
- share an activated TCI state.

20. The apparatus according to claim 16, wherein at least one of the following is satisfied:
- uplink target information elements corresponding to a same value of the first information correspond to a same uplink reference signal set;
- uplink target information elements corresponding to different values of the first information respectively correspond to different uplink reference signal set;
- uplink target information elements corresponding to a same value of the first information correspond to the same set of the first-type pre-coding information;
- uplink target information elements corresponding to different values of the first information respectively correspond to different sets of the first-type pre-coding information;
- wherein the same or the different uplink reference signal sets are configured by RRC signaling, the first-type pre-coding information of the uplink target information elements is selected from the uplink reference signal set by a control channel scheduling the uplink target information element, and the first-type pre-coding information comprises at least one or more of a Transmitted Pre-coding Matrix Indicator (TPMI) or a spatial transmitting filter.

* * * * *